(12) United States Patent
Sutton et al.

(10) Patent No.: US 8,836,805 B2
(45) Date of Patent: Sep. 16, 2014

(54) CURVED SENSOR SYSTEM

(76) Inventors: Gary Edwin Sutton, La Jolla, CA (US); Douglas Gene Lockie, Los Gatos, CA (US)

( * ) Notice: Subject to any disclaimer, the term of this patent is extended or adjusted under 35 U.S.C. 154(b) by 156 days.

(21) Appl. No.: 13/507,674

(22) Filed: Jul. 17, 2012

(65) Prior Publication Data
US 2014/0022424 A1    Jan. 23, 2014

(51) Int. Cl.
*H04N 5/225* (2006.01)
*H04N 3/14* (2006.01)
*H04N 5/335* (2011.01)
*H04N 5/247* (2006.01)

(52) U.S. Cl.
USPC ......... 348/218.1; 348/294; 348/374; 348/264

(58) Field of Classification Search
CPC ................. H01L 27/14605; H01L 27/14618; H01L 27/14683; H01L 27/14625; H01L 27/14623; H01L 27/14685; G02B 3/0037; G03B 2205/0092; G03B 17/28; G03B 15/00
USPC ............. 348/162–164, 240.2, 239, 294, 340, 348/360, 240.1, 79–86, 216.1; 396/268, 396/439, 534
See application file for complete search history.

(56) References Cited

U.S. PATENT DOCUMENTS

| | | | | |
|---|---|---|---|---|
| 6,526,160 B1 * | 2/2003 | Ito | | 382/117 |
| 6,881,943 B1 * | 4/2005 | Yegnashankaran | | 250/208.1 |
| 7,619,754 B2 * | 11/2009 | Riel et al. | | 356/625 |
| 7,733,397 B2 * | 6/2010 | Lu et al. | | 348/294 |
| 7,742,090 B2 * | 6/2010 | Street et al. | | 348/294 |
| 8,077,235 B2 * | 12/2011 | Street | | 348/294 |
| 8,232,617 B2 * | 7/2012 | Ma et al. | | 257/458 |
| 8,248,499 B2 * | 8/2012 | Sutton et al. | | 348/294 |
| 8,405,832 B2 * | 3/2013 | Schmaelzle et al. | | 356/445 |
| 8,492,876 B2 * | 7/2013 | Wong et al. | | 257/618 |
| 2003/0141433 A1 * | 7/2003 | Gordon | | 250/208.1 |
| 2004/0056971 A1 * | 3/2004 | Yang et al. | | 348/294 |
| 2008/0151084 A1 * | 6/2008 | Lu et al. | | 348/294 |
| 2008/0151089 A1 * | 6/2008 | Street et al. | | 348/308 |
| 2008/0237443 A1 * | 10/2008 | Oliver et al. | | 250/200 |
| 2008/0316462 A1 * | 12/2008 | Riel et al. | | 356/3 |
| 2009/0115875 A1 * | 5/2009 | Choi et al. | | 348/294 |
| 2009/0184954 A1 * | 7/2009 | Street | | 345/419 |
| 2009/0219402 A1 * | 9/2009 | Schneider | | 348/208.7 |
| 2010/0096729 A1 * | 4/2010 | Wong et al. | | 257/620 |
| 2010/0308429 A1 * | 12/2010 | Ma et al. | | 257/443 |
| 2011/0141476 A1 * | 6/2011 | Schmaelzle et al. | | 356/445 |
| 2011/0285882 A1 * | 11/2011 | Winter | | 348/294 |

* cited by examiner

*Primary Examiner* — Timothy J Henn
*Assistant Examiner* — Pritham Prabhakher
(74) *Attorney, Agent, or Firm* — Thomas N. Giaccherini

(57) ABSTRACT

Methods and apparatus for a Curved Sensor System are disclosed. The present invention includes a wide variety of generally curved, aspheric or non-planar arrangement of sensors and their equivalents. The curved surfaces, edges or boundaries that define the geometry of the present invention may be continuous, or may be collections or aggregations of many small linear, planar or other segments which are able to approximate a curved line or surface.

10 Claims, 25 Drawing Sheets

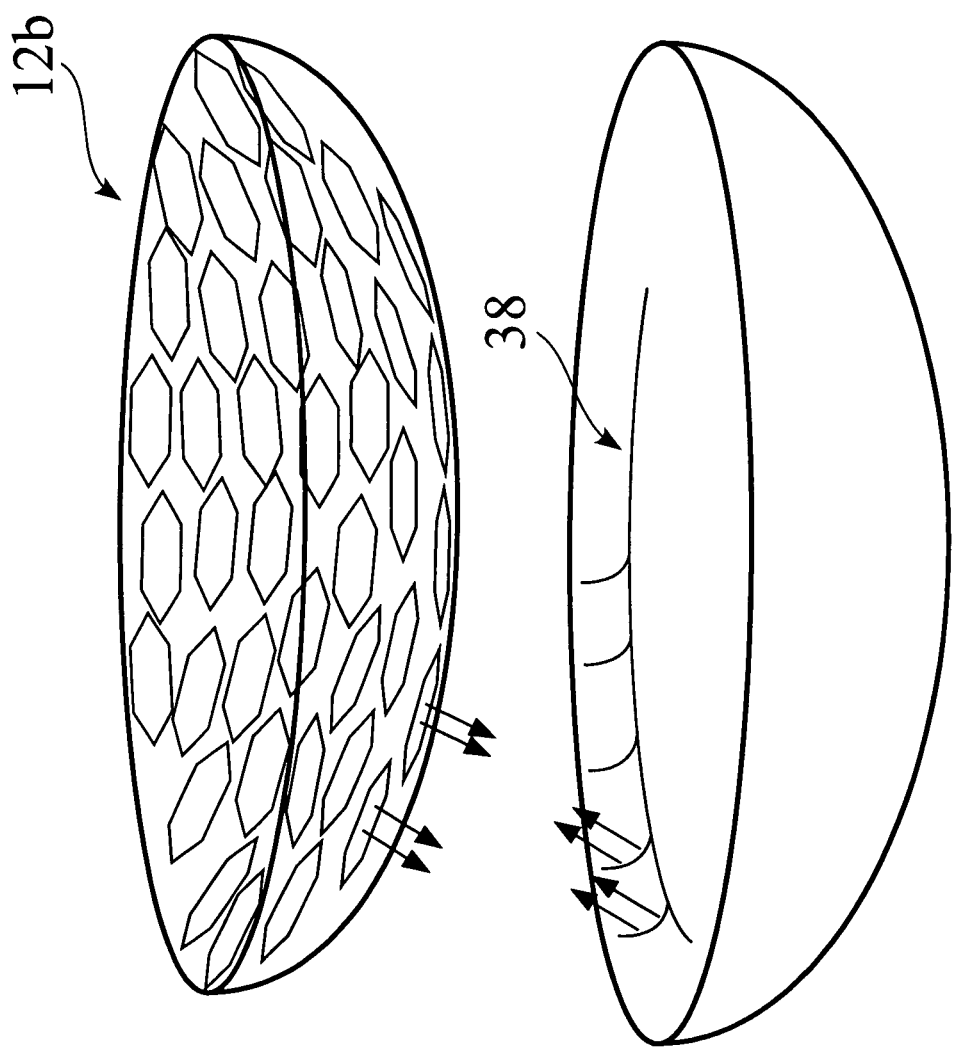

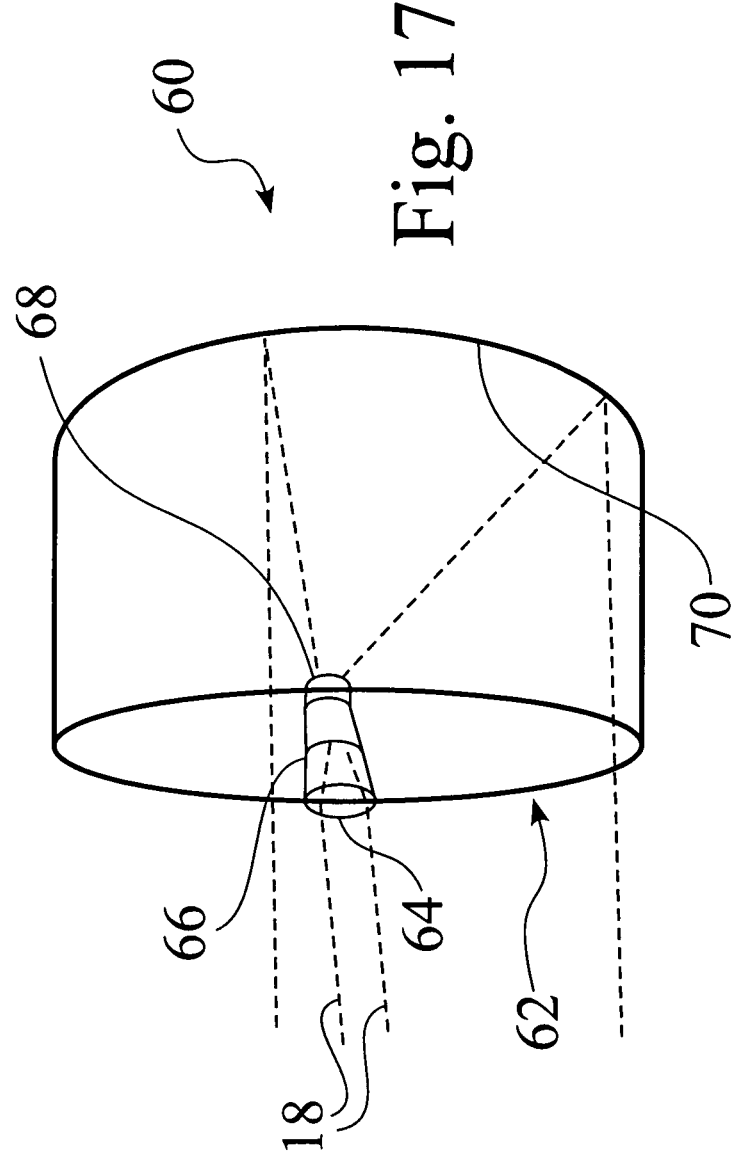

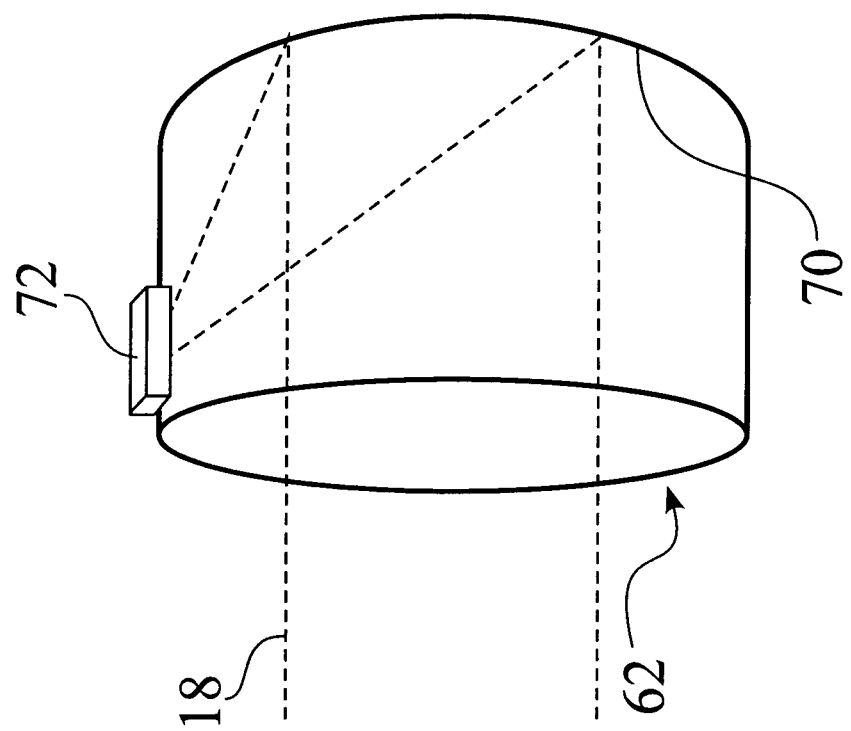

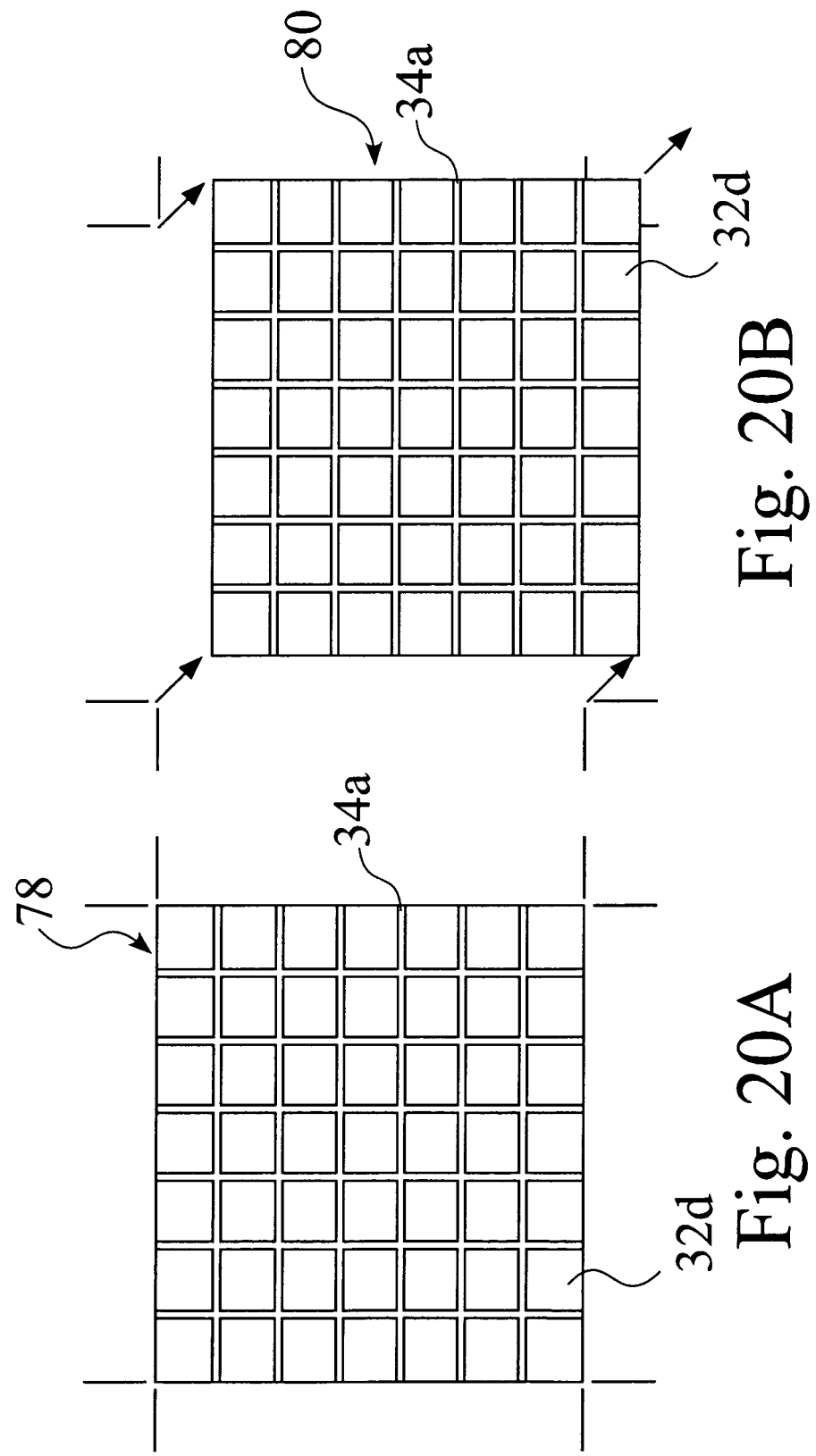

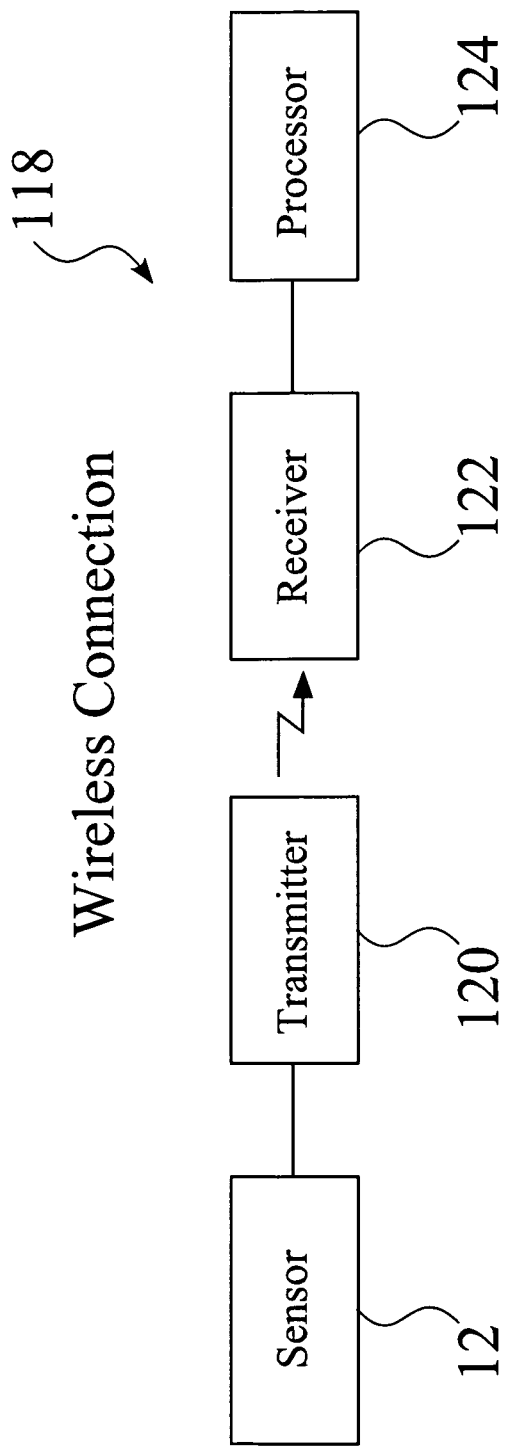

CURVED SENSOR SYSTEM

FIELD OF THE INVENTION

The present invention relates to imaging and sensors. More particularly, one embodiment of the present invention may be used in a digital camera to provide enhanced photographic capabilities.

CROSS-REFERENCE TO RELATED PATENT APPLICATIONS & CLAIMS FOR PRIORITY

The present application is related to the following patent applications:

Pending U.S. Non-Provisional application Ser. No. 13/506,485, filed on 19 Apr. 2012; (CON D);

Pending U.S. Non-Provisional application Ser. No. 13/135,402, filed on 30 Jun. 2011; (CIPC)

Pending U.S. Non-Provisional application Ser. No. 13/065,477, filed on 21 Mar. 2011; (CIPB)

Pending U.S. Non-Provisional application Ser. No. 12/930,165, filed on 28 Dec. 2010; (CIPA)

Pending U.S. Non-Provisional application Ser. No. 12/655,819, filed on 6 Jan. 2010; (Parent)

Provisional Patent Application 61/208,456, filed on 23 Feb. 2009.

The Applicants claim the benefit of priority for any and all subject matter which is commonly disclosed in the Present Patent Application, and in the Patent Applications listed above.

FEDERALLY SPONSORED RESEARCH OR DEVELOPMENT

None.

BACKGROUND OF THE INVENTION

The number of digital cameras sold per year worldwide now exceeds one hundred million. The number of cellular telephones that include cameras that are sold per year worldwide now exceeds one billion. In general, these conventional cameras all include flat sensors.

The development of a system with a sensor that improves upon conventional flat sensors would constitute a major technological advance, and would satisfy long-felt needs in the telephone, photography and remote sensing businesses.

SUMMARY OF THE INVENTION

The present invention comprises methods and apparatus for a non-planar sensor that may be incorporated into a camera or some other suitable radiation gathering device that will provide enhanced optical performance.

A BRIEF DESCRIPTION OF THE DRAWINGS

FIG. 1 provides a generalized schematic diagram of a digital camera with a curved sensor manufactured in accordance with one embodiment of the present invention.

FIGS. 2A, 2B, and 2C offer an assortment of views of a generally curved sensor.

FIG. 3 depicts a sensor formed from nine planar segments or facets.

FIG. 4 reveals a cross-sectional view of a generally curved surface comprising a number of flat facets.

FIG. 5 provides a perspective view of the curved surface shown in FIG. 4.

FIG. 6 offers a view of one method of making the electrical connections for the sensor shown in FIGS. 6 and 7.

FIGS. 7A and 7B portray additional details of the sensor illustrated in FIG. 5, before and after enlarging the gaps above the substrate, the flat surface can be bent.

FIG. 8 supplies a view of sensor connections.

FIGS. 9A and 9B depict a series of petal-shaped segments of ultra-thin silicon that are bent or otherwise formed to create a generally dome-shaped surface.

FIG. 10 furnishes a detailed view of an array of sensor segments.

FIGS. 16A, 16B, 16C and 16D provide schematic views of a camera with a retractable and extendable shade. When the camera is used for wide angle shots, the lens shade automatically retracts. For telephoto shots, the lens shade automatically extends. For normal perspectives, the lens shade automatically protrudes partially.

FIG. 17 offers a view of another implementation of the present invention, a mirrored camera/lens combination.

FIG. 18 furnishes a view of another embodiment of a mirrored camera/lens combination.

Figure 19B:
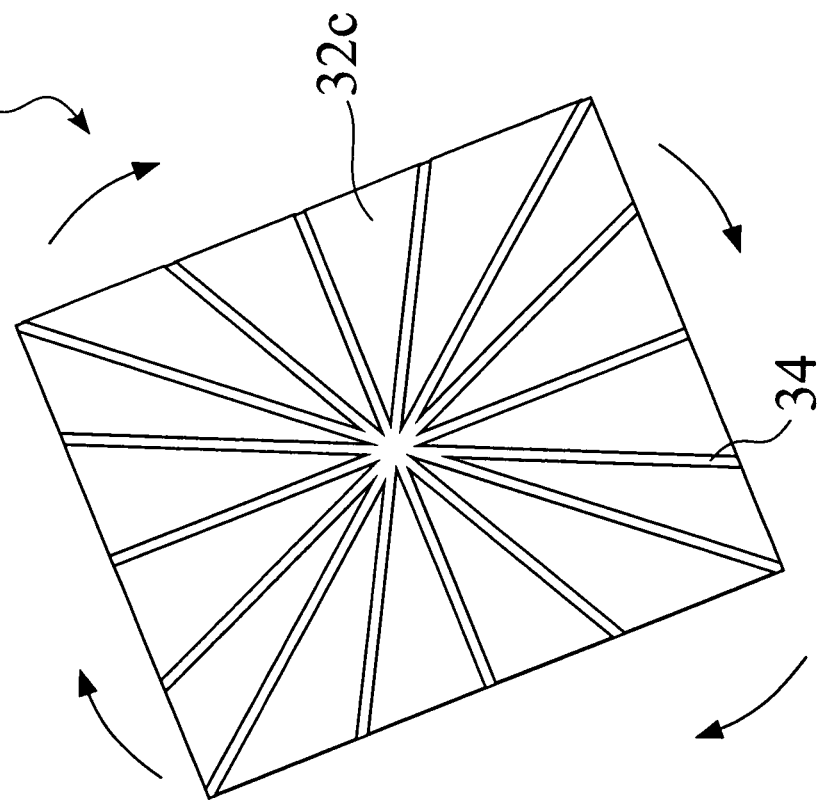
Figure 19A:
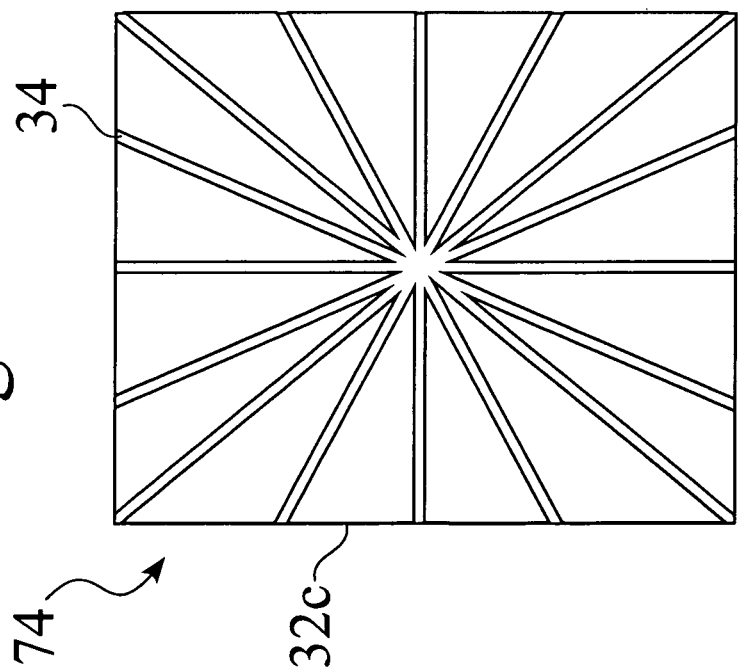
Figure 21A:
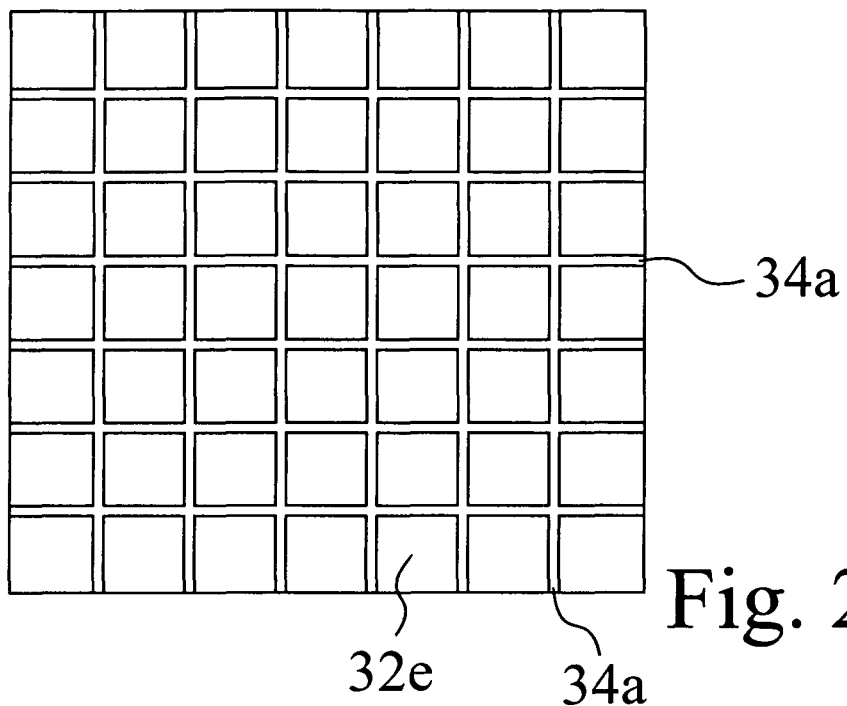
Figure 21B:
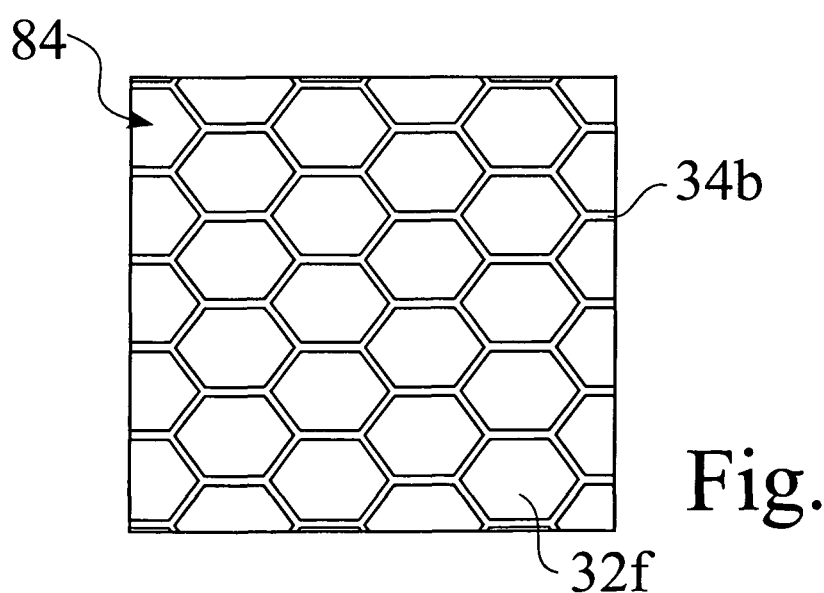
Figure 21C:
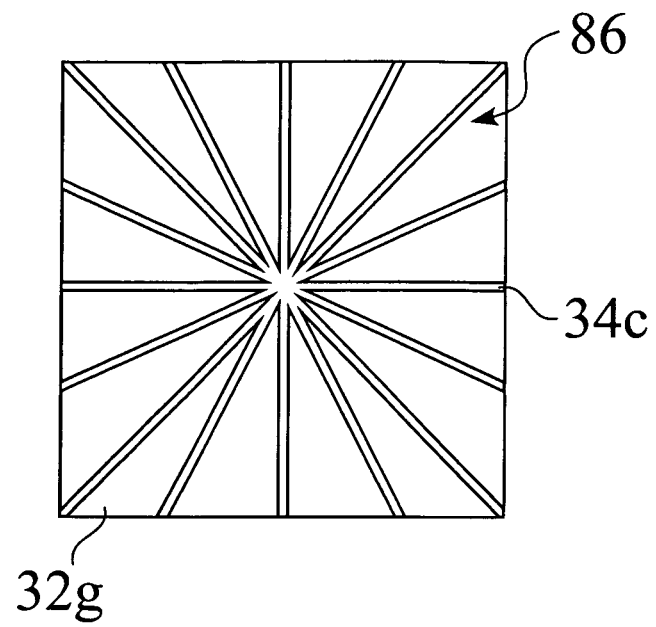
Figure 21D:
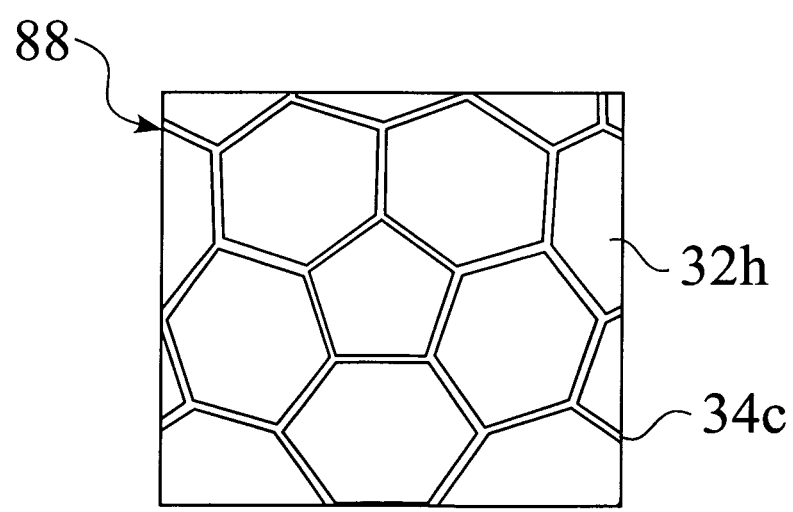

FIGS. 19A and 19B supply two views of a composite sensor. In the first view, the sensor is aligned in its original position, and captures a first image. In the second view, the sensor has been rotated, and captures a second image. The two successive images are combined to produce a comprehensive final image.

FIGS. 20A and 20B offer an alternative embodiment to that shown in FIGS. 19A and 19B, in which the sensor position is displaced diagonally between exposures.

FIGS. 21A, 21B, 21C and 21D offer four views of sensors that include gaps between a variety of arrays of sensor facets.

Figure 22:
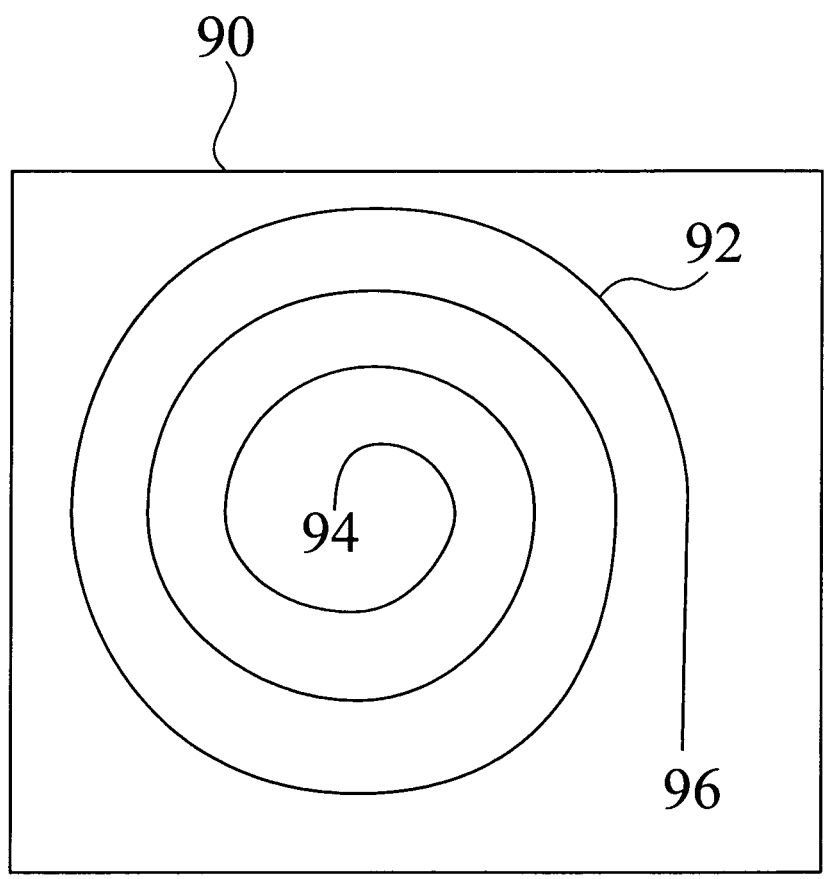
Figure 23:
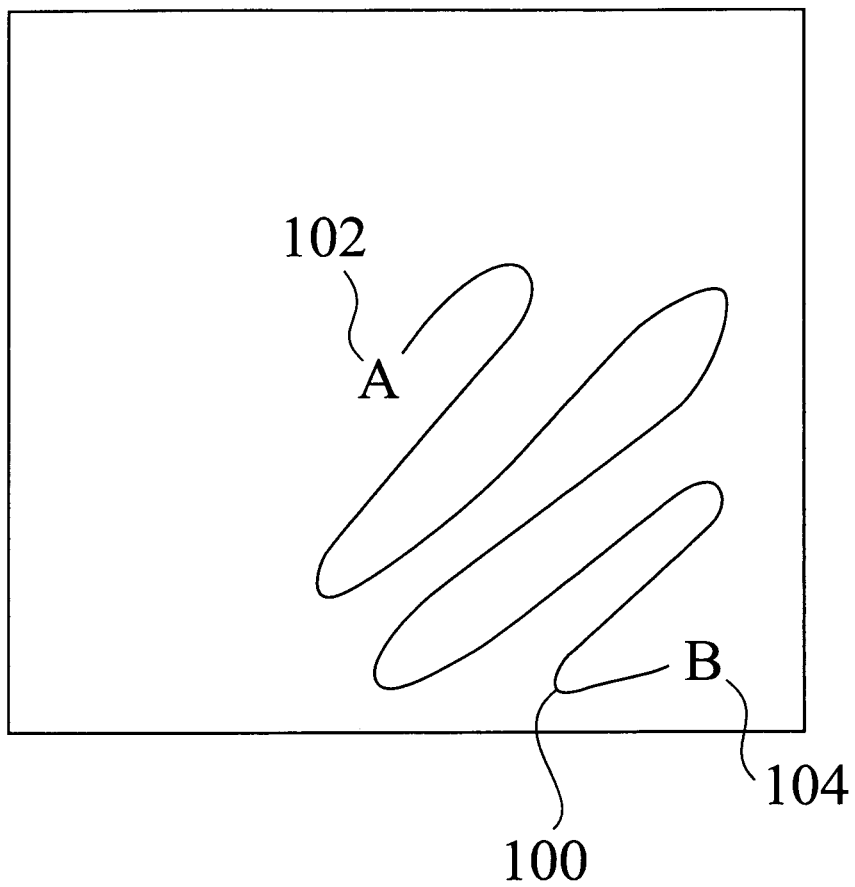
Figure 24:
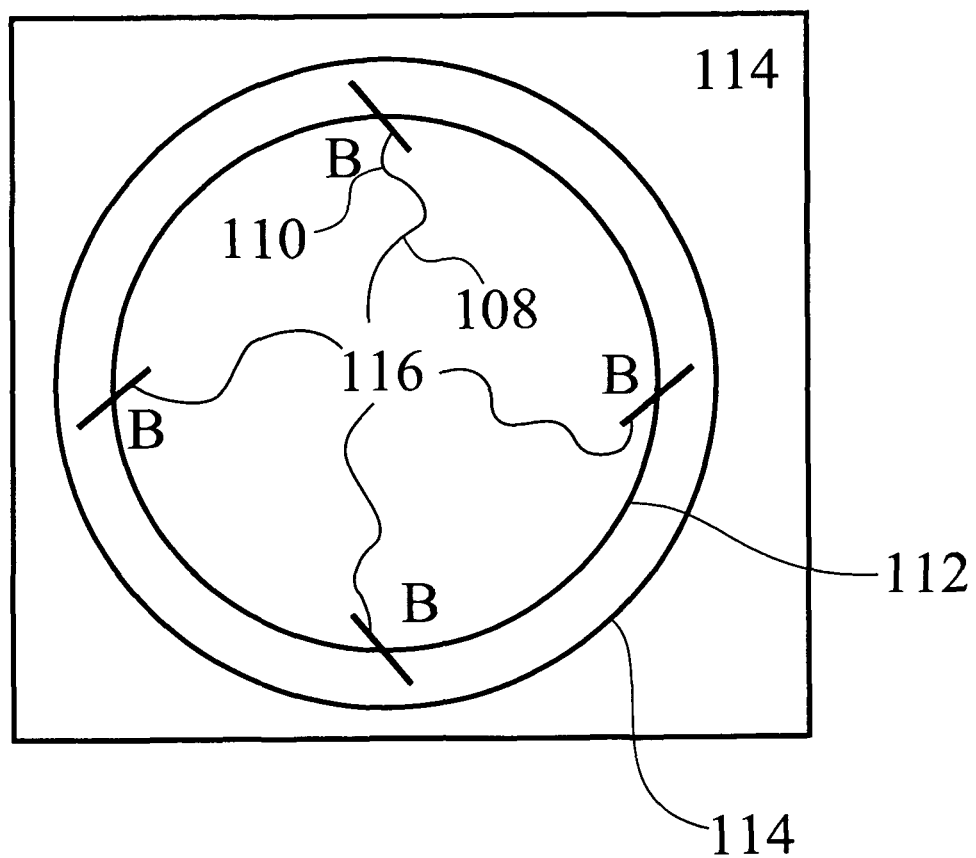

FIGS. 22, 23 and 24 provide illustrations of the back of a moving sensor, revealing a variety of connecting devices which may be used to extract an electrical signal, and, may be used to power the sensor.

FIG. 25 is a block diagram that illustrates a wireless connection between a sensor and a processor.

A DETAILED DESCRIPTION OF PREFERRED & ALTERNATIVE EMBODIMENTS

I. A Camera with a Curved Sensor

The present invention comprises methods and apparatus for a Curved Sensor System. The present invention includes a wide variety of generally curved, aspheric or non-planar sensors and their equivalents. The curved surfaces, edges or boundaries that define the geometry of the present invention may be continuous, or may be aggregations of many small planar or other segments which approximate a curved surface. In general, the sensor which is described and claimed in the present patent application occupies three dimensions of space, as opposed to conventional sensors, which are planes that are substantially and generally contained in two physical dimensions. The present invention includes sensors which are configured in a variety of three-dimensional shapes, including, but not limited to, spherical, paraboloidal and ellipsoidal surfaces. In addition, the present invention also includes sensors which comprise segments or facets that approximate a curved surface.

In this Specification and in the Claims that follow, the term "curved" encompasses any line, edge, boundary, segment, surface or feature that is not completely colinear with a straight line. In this Specification and in the Claims that follow, the term "sensor" encompasses any detector, imaging device, measurement device, transducer, focal plane array, charge-coupled device (CCD), complementary metal-oxide semiconductor (CMOS) or photocell that responds to an incident photon of any wavelength.

While one embodiment of the present invention is designed to record images in the optical spectrum, other embodiments of the present invention may be used for a variety of tasks which pertain to gathering, sensing and/or recording other forms of radiation. The present invention includes systems that gather and/or record color, black and white, infra-red, ultraviolet, x-rays or any other form of radiation, emanation, wave or particle. The present invention also includes systems that record still images or partial or full-motion moving pictures.

Figure 1:
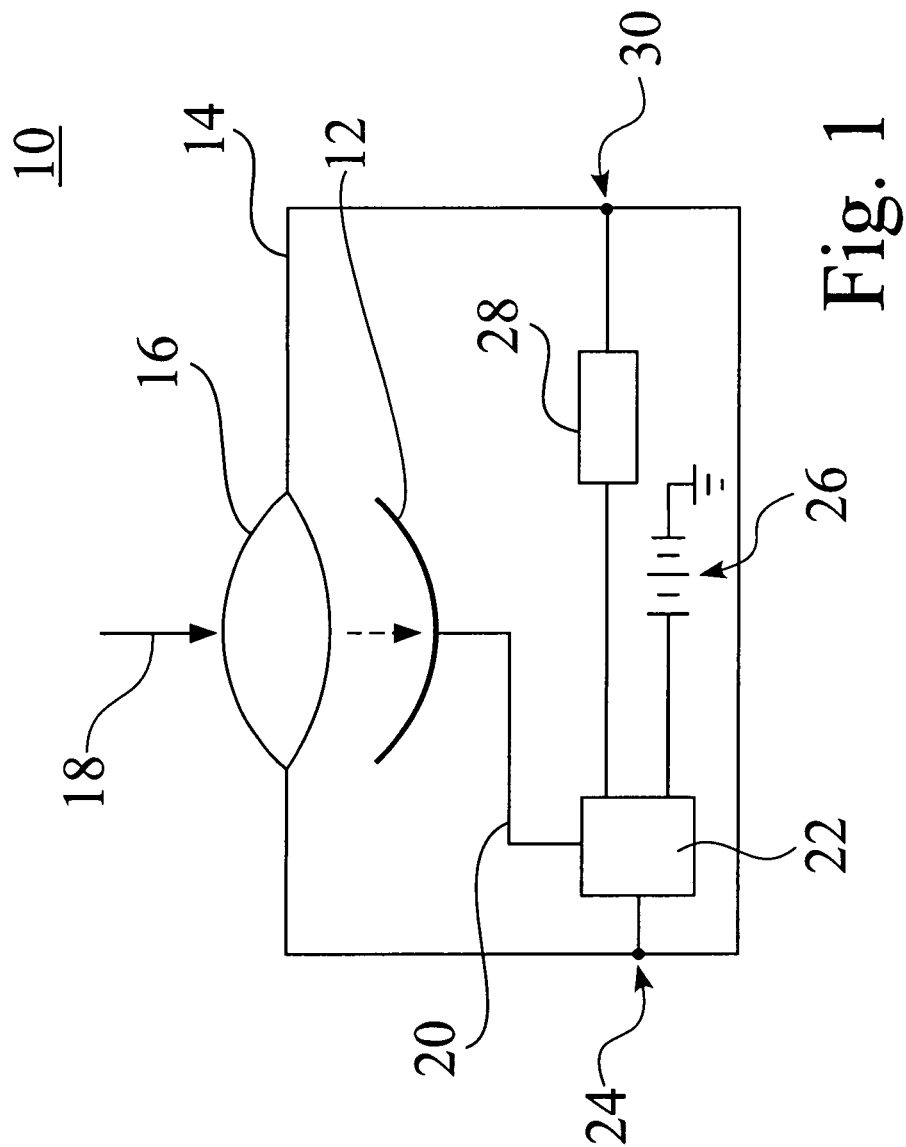

FIG. 1 provides a generalized schematic diagram of a digital camera 10 with a curved sensor 12. A housing 14 has an objective lens 16 mounted on one of its walls. The objective lens 16 receives incoming light 18. In general, the sensor 12 converts the energy of the incoming photons 18 to an electrical output 20, which is then fed to a signal or photon processor 22. The signal processor 22 is connected to user controls 24, a battery or power supply 26 and to a solid state memory 28. Images created by the signal processor 22 are stored in the memory 28. Images may be extracted or downloaded from the camera through an output terminal 30, such as a USB port.

II. Alternative Sensor Geometries

Figure 2:
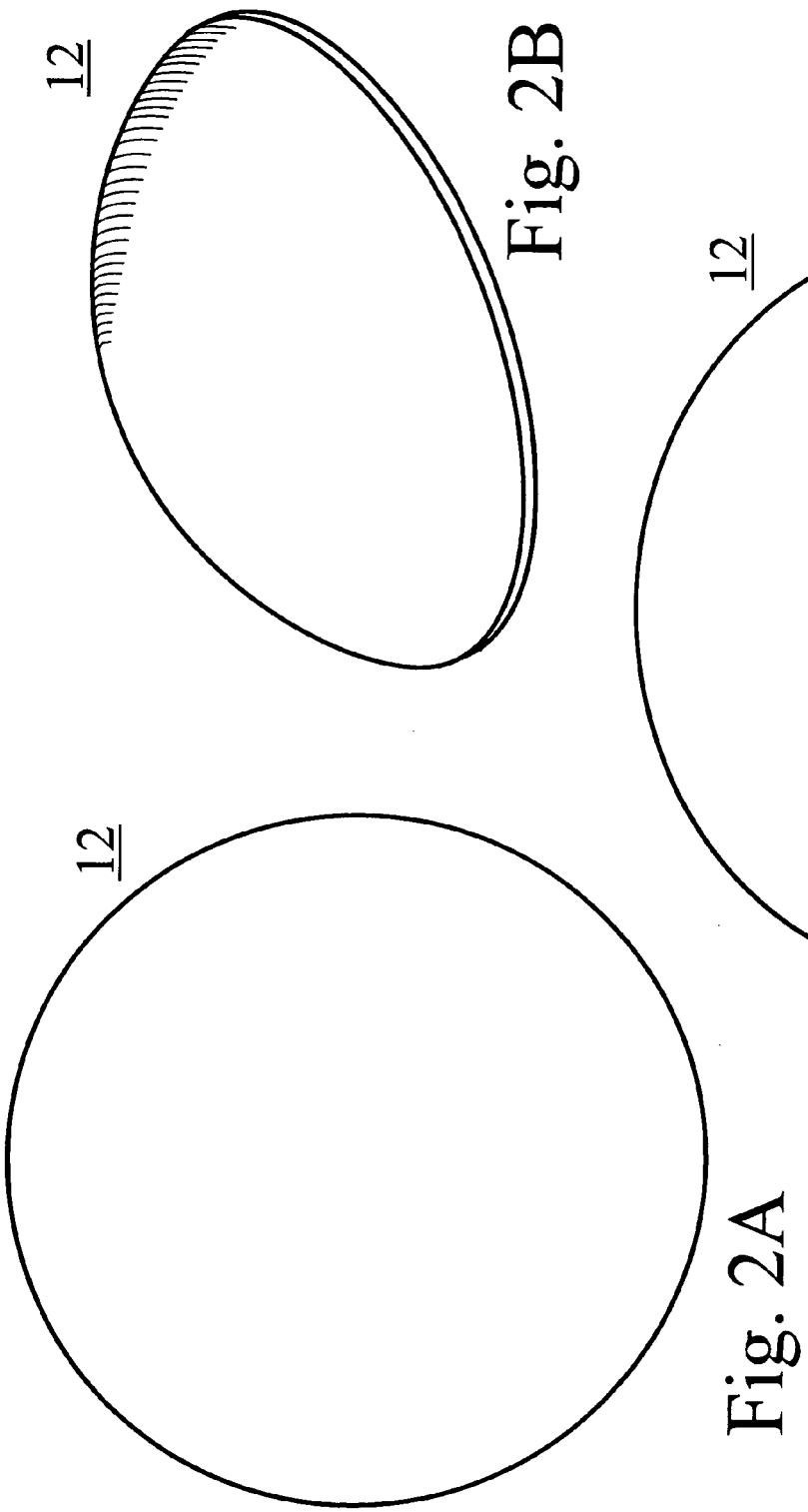

The present invention includes, but is not limited to, the following embodiments of sensors and/or their equivalents:

1. Curved sensors: Generally continuous portions of spheres, or revolutions of conic sections such as parabolas or ellipses or other non-planar shapes. Examples of a generally curved sensor 12 appear in FIGS. 2A, 2B and 2C. In this Specification, and in the Claims that follow, various embodiments of curved sensors are identified with reference character 12, 12a, 12b, 12c, and so on.

Figure 3:
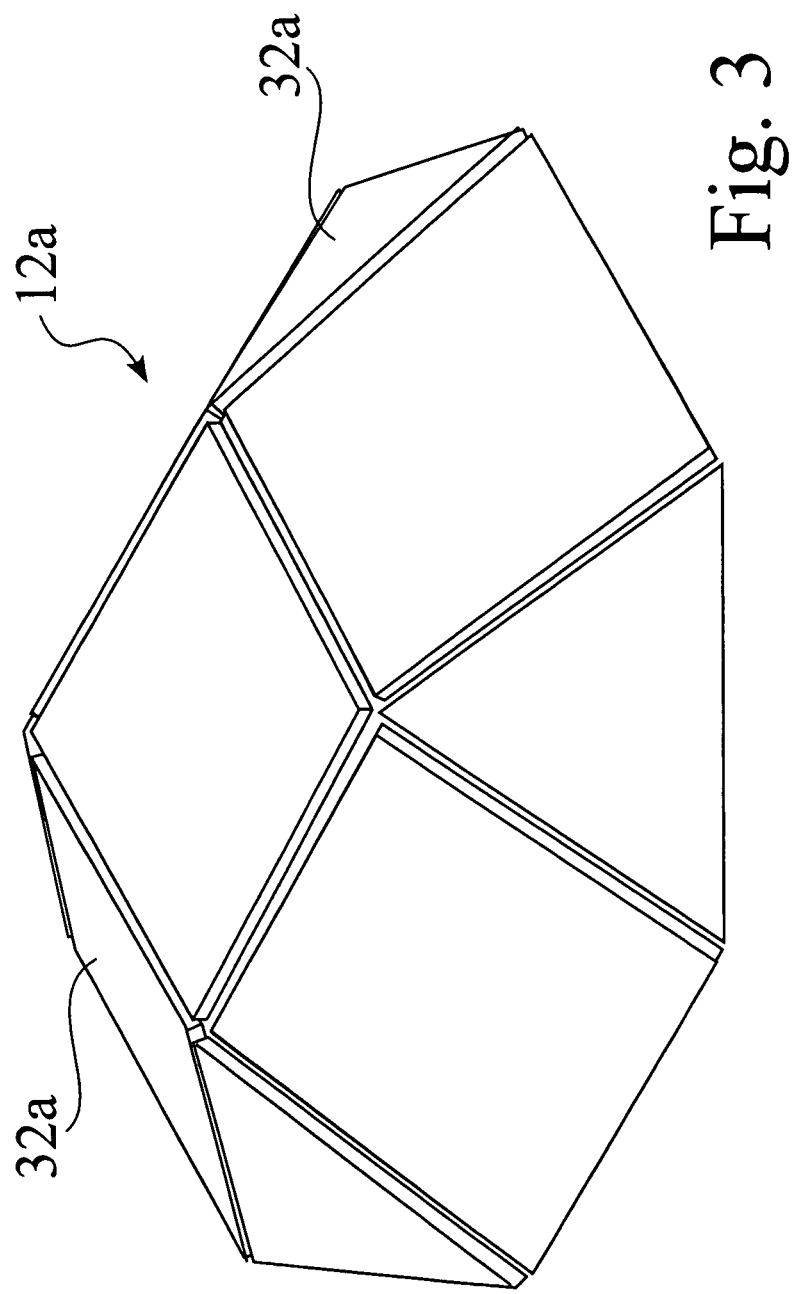
Figure 4:
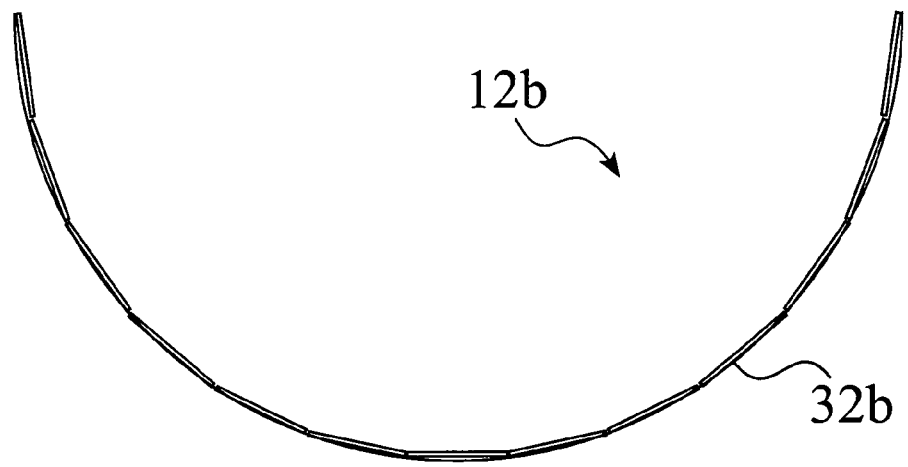
Figure 5:
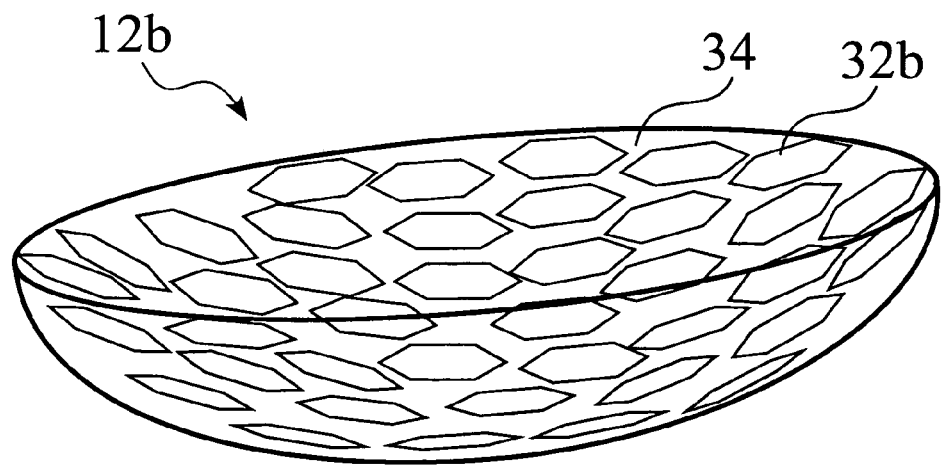

2. Faceted sensors: Aggregations of polygonal facets or segments. Any suitable polygon may be used to implement the present invention, including triangles, squares, rectangles, trapezoids, pentagons, hexagons, septagons, octagons or others. FIG. 3 exhibits a sensor 12a comprising nine flat polygonal segments or facets 32a. For some applications, a simplified assembly of a few flat sensors might yield most of the benefit of a smooth curve, while achieving a lower assembly cost. FIGS. 4 and 5 provide side and perspective views of a generally spherical sensor surface 12b comprising a larger number of flat facets 32b. FIG. 5 shows exaggerated gaps 34 between the facets. The facets could each have hundreds, thousands or many millions of pixels. In this Specification, and in the Claims that follow, the facets of the sensor 12 are identified with reference characters 32, 32a, 32b, 32c and so on.

Figure 6:
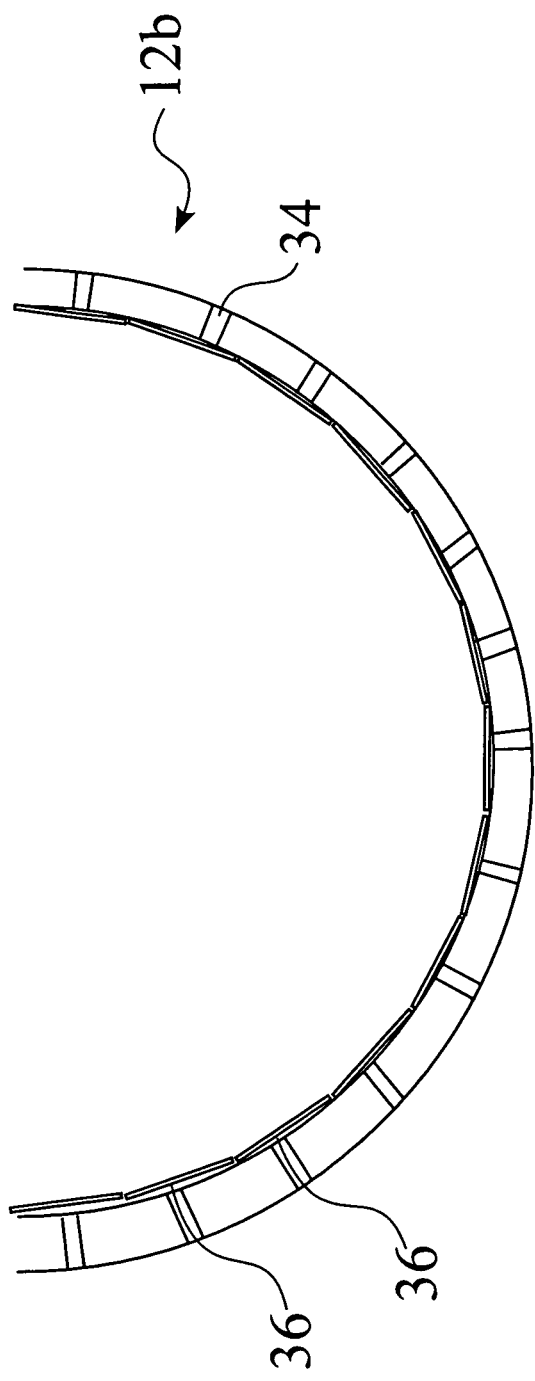

FIG. 6 offers a view of the electrical connections 36 for the curved sensor 12b shown in FIG. 5. The semiconductor facet array is disposed on the interior surface. The exterior surface may be a MYLAR™, KAPTON™ or similar wiring backplane formed in a curved shape. Vias provide electrical connections between the facet array and the wiring backplane. In one embodiment, two to two thousand or more electrical pathways may connect the facet array and the wiring backplane.

FIG. 8 provides a detailed view of facets on the curved sensor 12b. In general, the more polygons that are employed to mimic a generally spherical surface, the more the sensor will resemble a smooth curve. In one embodiment of the invention, a wafer is manufactured so that each camera sensor has tessellated facets. The back side of the wafer of sensor chips is attached to a flexible membrane that may bend slightly (such as MYLAR™ or KAPTON™), but which is sufficiently rigid to maintain the individual facets in their respective locations. A thin line is etched into the silicon chip between each facet, but not through the flexible membrane. The wafer is then shaped into a generally spherical surface. Each facet is manufactured with vias formed through the wafer to connect a backside wiring harness. This harness may also provide mechanical support for the individual facets.

Figure 7A:
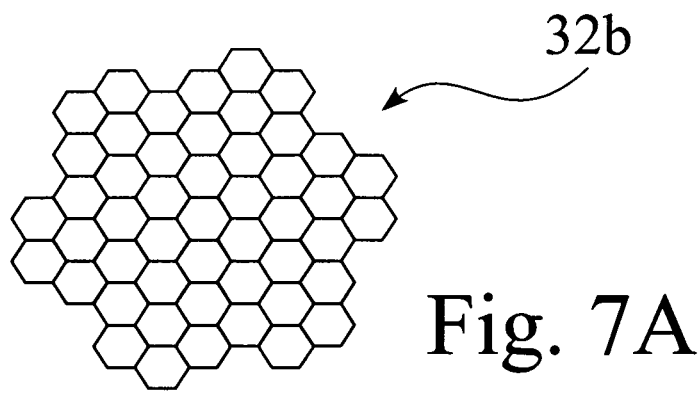
Figure 7B:
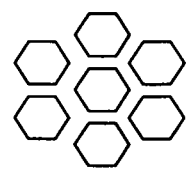

FIGS. 7A and 7B furnish a view of the facets 32b which reside on the interior of the curved sensor, and the electrical interconnects that link the sensor facets with the wiring backplane.

FIG. 8 illustrates a wiring backplane 38 which may be used to draw output signals from the facets on the sensor.

Figure 9A:
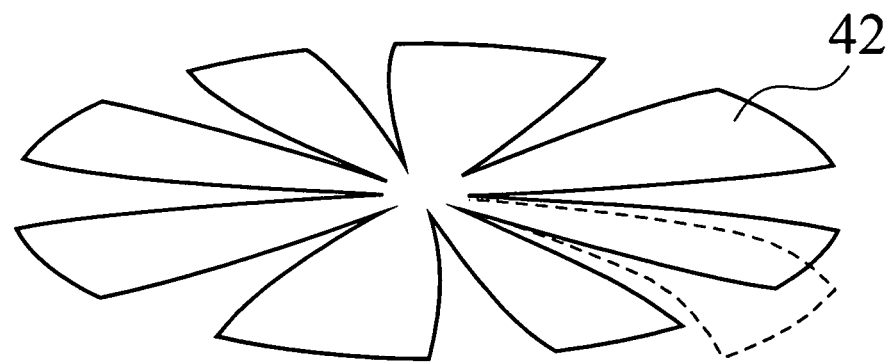
Figure 9B:
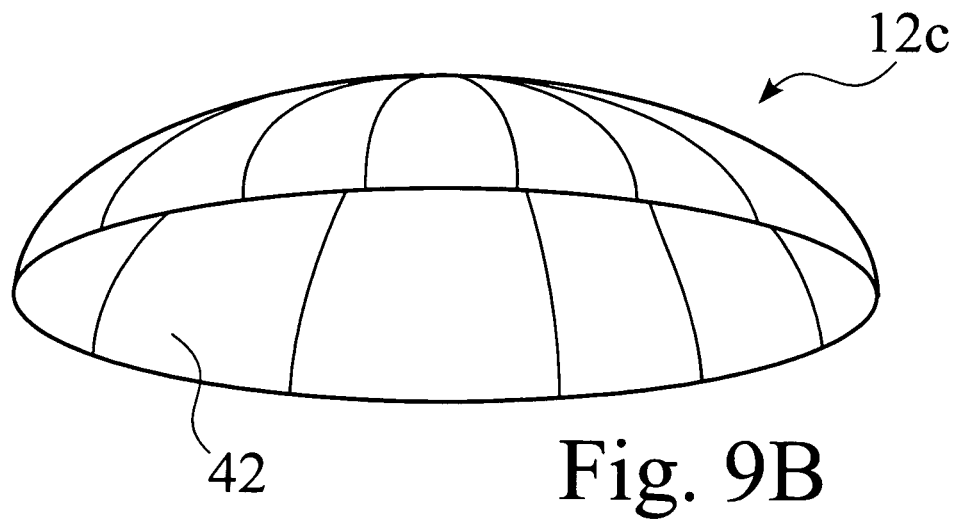

FIGS. 9A and 9B show a generally hemispherical shape 40 that has been formed by bending and then joining a number of ultra-thin silicon petal-shaped segments 42. These segments are bent slightly, and then joined to form the curved sensor.

Figure 10:
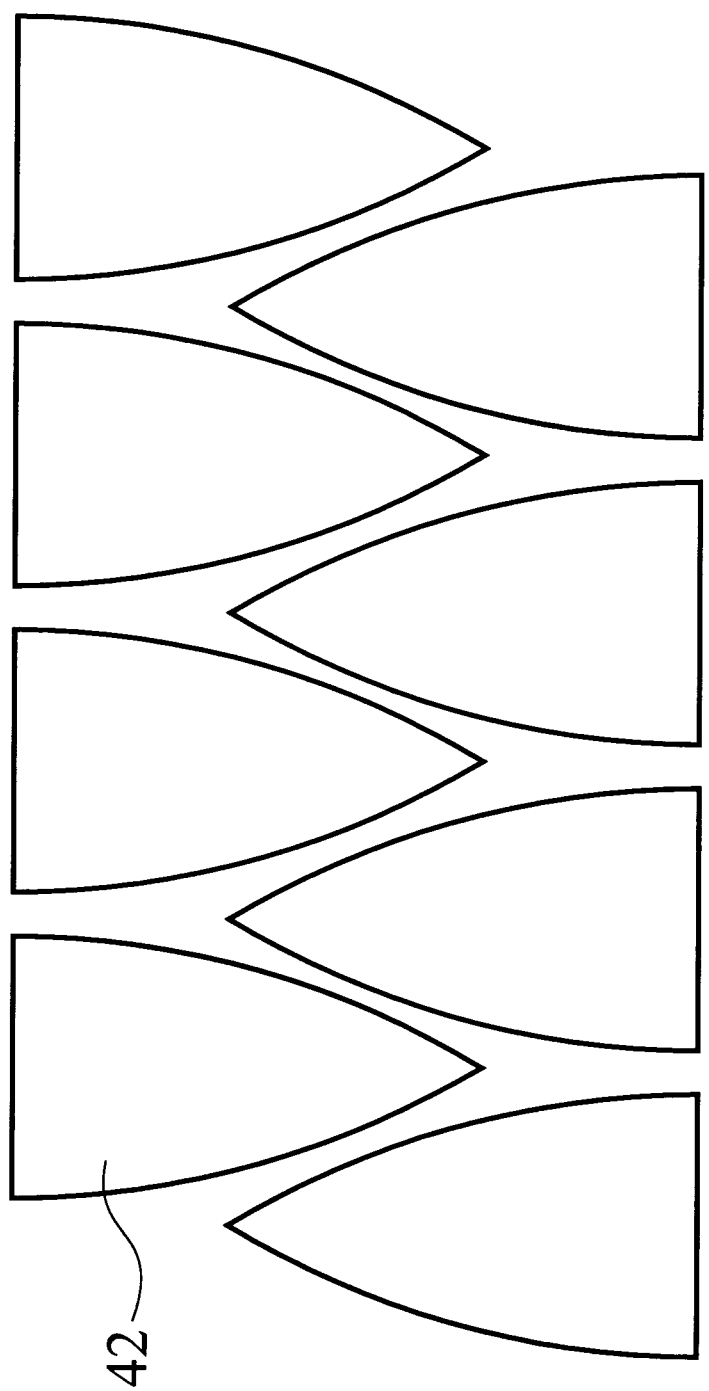

FIG. 10 provides a view of one embodiment of the petal-shaped segments 42. Conventional manufacturing methods may be employed to produce these segments. In one embodiment, these segments are formed from ultra-thin silicon, which are able to bend somewhat without breaking. In another embodiment, pixel density is increased at the points of the segments, and are gradually decreased toward the base of each segment. This embodiment may be implemented by programming changes to the software that creates the pixels.

Figure 11:
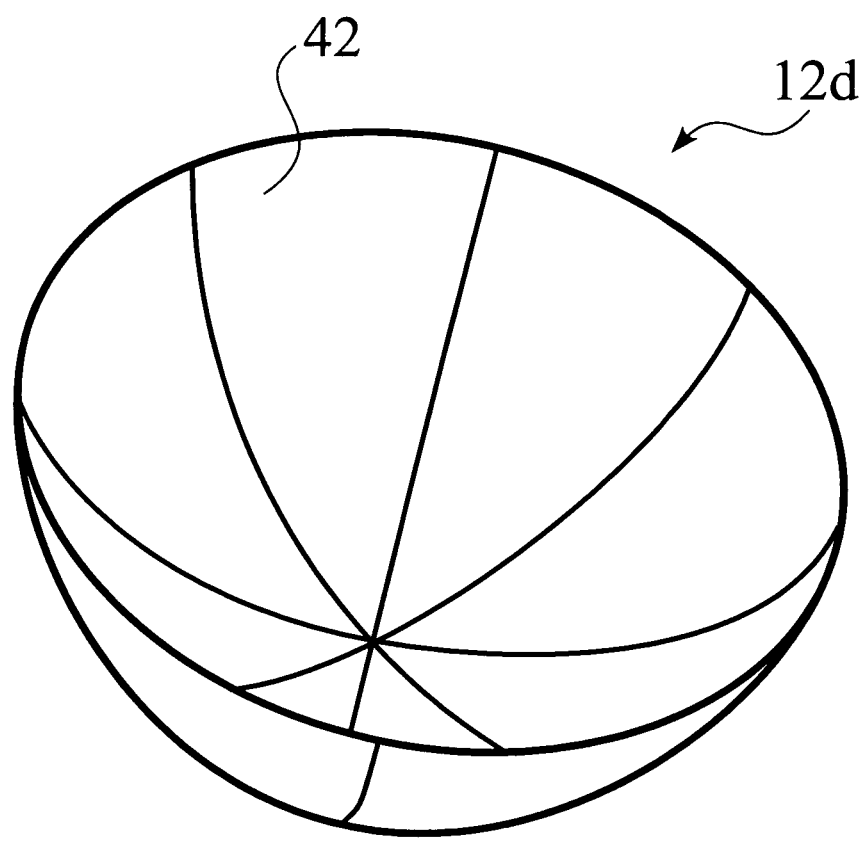
FIG. 11 is a perspective view of a curved shape that is produced when the segments shown in FIG. 10 are joined.

FIG. 11 offers a perspective view of one embodiment of a curved shape that is formed when the segments shown in FIG. 10 are joined. The joining is accomplished using a flash of heat and painted surfaces to locate the heat on the planes, where the maximum compression and tension occur in folding. The sensors are placed on the concave side, while the electrical connections are made on the convex side. The number of petals used to form this non-planar surface may comprise any suitable number. Heat or radiation may be employed to form the silicon into a desired shape. The curvature of the petals may be varied to suit any particular sensor design.

In one alternative embodiment, a flat center sensor might be surrounded by these "petals" with squared-off points.

II. Advantages & Alternative Embodiments

Digital Zoom

Figure 12:
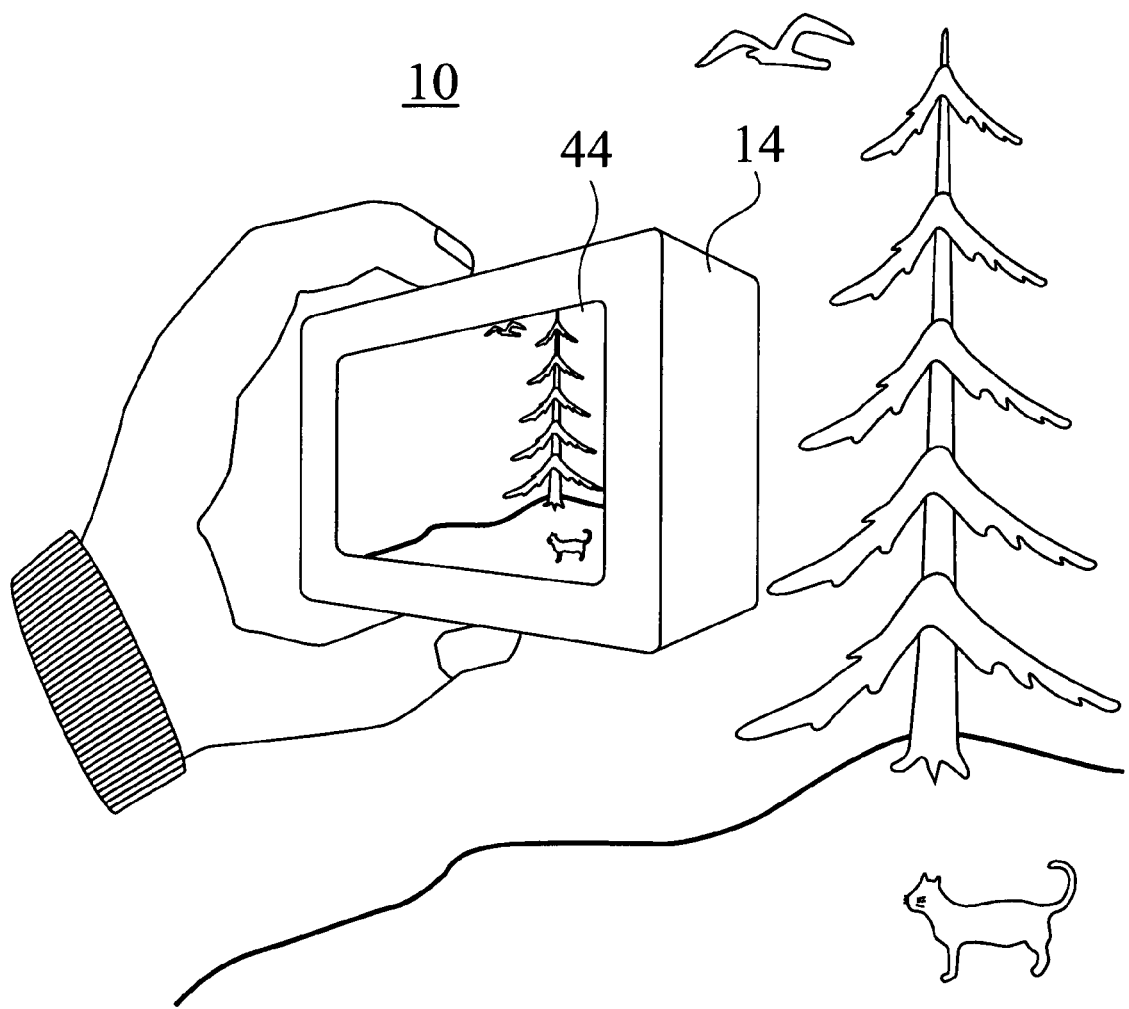
FIG. 12 shows a camera taking a wide angle photo image.
Figure 13:
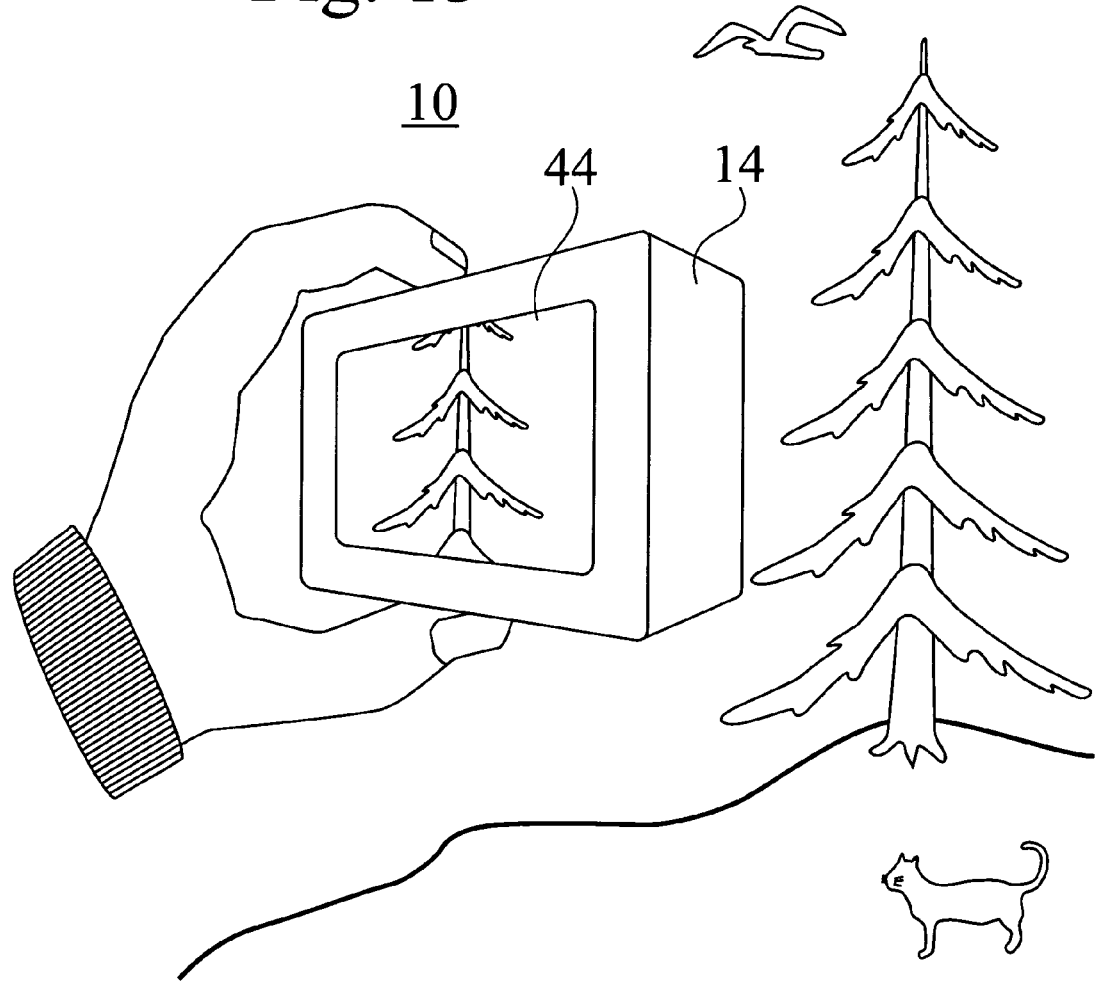
FIG. 13 shows a camera taking a normal perspective photo image.
Figure 14:
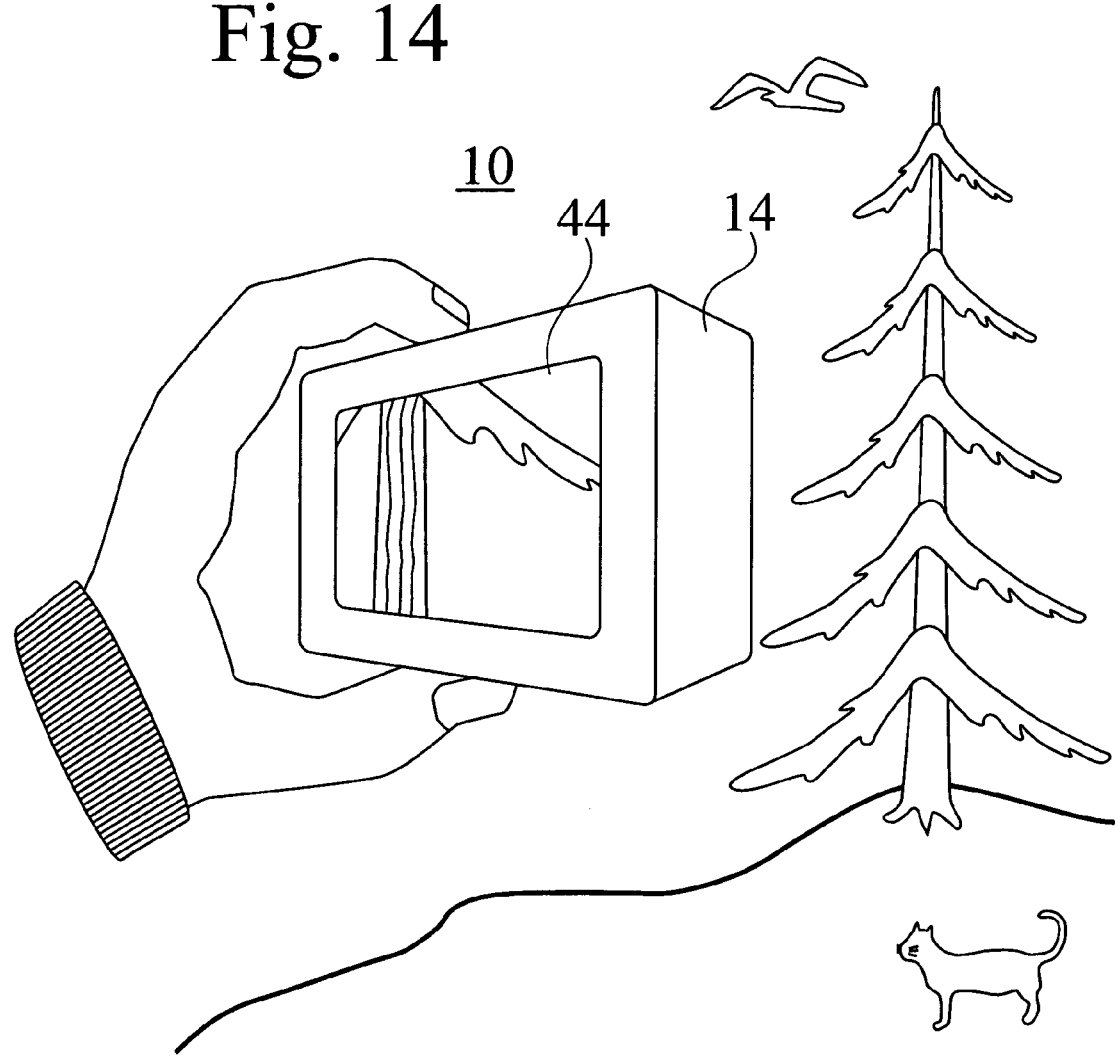
FIG. 14 shows a camera taking a telephoto image.

FIG. 12 shows a camera taking a wide angle photo. FIG. 13 shows the same camera taking a normal perspective photo, while FIG. 14 shows a telephoto view. In each view, the scene stays the same. The view screen on the camera shows a panorama in FIG. 12, a normal view in FIG. 13, and detail from the distance in FIG. 14. Just as with optical zoom, digital zoom shows the operator exactly the scene that is being captured by the camera sensor.

Digital zoom is software-driven. The camera either captures only a small portion of the central image, the entire scene or any perspective in between. The monitor shows the operator what portion of the overall image is being recorded. When digitally zooming out to telephoto in one embodiment of the present invention, which uses denser pixels in its center, the software can use all the data. Since the center has more pixels per area, the telephoto image, even though it is cropped down to a small section of the sensor, produces a crisp image. This is because the pixels are more dense at the center.

When the camera has "zoomed back" into a wide angle perspective, the software can compress the data in the center to approximate the density of the pixels in the edges of the image. Because so many more pixels are involved in the center of this wide angle scene, this doesn't effect wide angle image quality. Yet, if uncompressed, the center pixels represent unnecessary and invisible detail captured, and require more storage capacity and processing time. Current photographic language might call the center section as being processed "RAW" or uncompressed when shooting telephoto but being processed as "JPEG" or other compression algorithm in the center when the image is wide angle.

The present invention will provide lighter, faster, cheaper and more dependable cameras. In one embodiment, the present invention will provide digital zoom. Since the present invention will not require optical zoom, it will use inherently lighter lens designs with fewer elements, no lens mounting brackets, and can be hermetically sealed.

In one embodiment of the invention, more pixels are concentrated in the center of the sensor, and fewer are placed at the edges of the sensor. Various densities may be arranged in between the center and the edges. This embodiment allows the user to zoom into a telephoto shot using the center section only, and still have high resolution.

When viewing the photograph in the wide field of view, the center pixels are "binned" or summed together to normalize the resolution to the value of the outer pixel density.

When viewing the photograph in telephoto mode, the center pixels are utilized in their highest resolution, showing maximum detail without requiring any adjustment of lens or camera settings.

The present invention offers extra wide angle to extreme telephoto zoom. This feature is enabled due to the extra resolving power, contrast, speed and color resolution lenses will be able to deliver when the digital sensor is not flat, but curved, somewhat like the retina of a human eye. The average human eye, with a cornea and single lens element, uses, on average, 25 million rods and 6 million cones to capture images. This is more image data than is captured by all but a rare and expensive model or two of the cameras that are commercially available today, and those cameras typically must use seven to twenty element lenses, since they are constrained by flat sensors. These cameras cannot capture twilight images without artificial lighting. These high-end cameras currently use sensors with up to 43 mm diagonal areas, while the average human eyeball has a diameter of 25 mm. Eagle eyes, which are far smaller, have eight times the sensors as a human eye, again showing the optical potential that a curved sensor or retina yields. The present invention is more dependable, cheaper and higher performance. Interchangeable or zoom lenses are no longer necessary, which eliminates the need for moving lenses and connecting mechanisms. Further savings are realized due to simpler lens designs, with fewer elements, because flat film and sensors, unlike curved surfaces, are at varying distances and angles from the light coming from the lens. This causes chromatic aberrations and varying intensity across the sensor. To compensate for that, current lenses, over the last two centuries, have mitigated the problem almost entirely, but, with huge compromises. Those compromises include limits on speed, resolving power, contrast, and color resolution. Also, the conventional lens designs require multiple elements, some aspheric lenses, exotic materials and special coatings for each surface. And, there are more air to glass surfaces and more glass to air surfaces, each causing loss of light and reflections.

Variable Density of Pixels

In one embodiment of the present invention, the center of the sensor, where the digitally zoomed telephoto images are captured, is configured with dense pixilation, which enables higher quality digitally zoomed images.

Figure 15A:
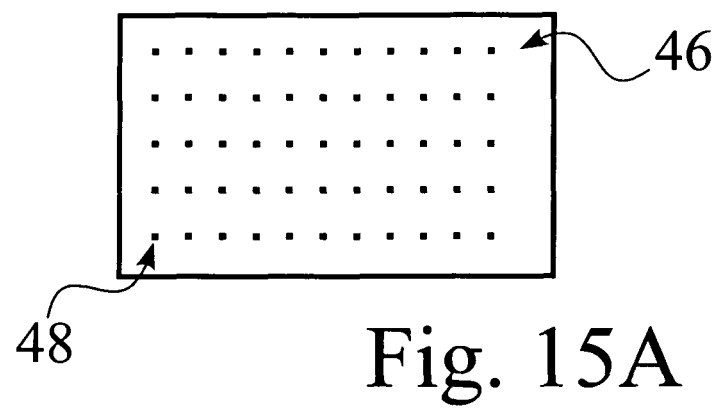
FIGS. 15A and 15B illustrate the feature of variable pixel density by comparing views of a conventional sensor with one of the embodiments of the present invention, where pixels are more concentrated in the center.
Figure 15B:
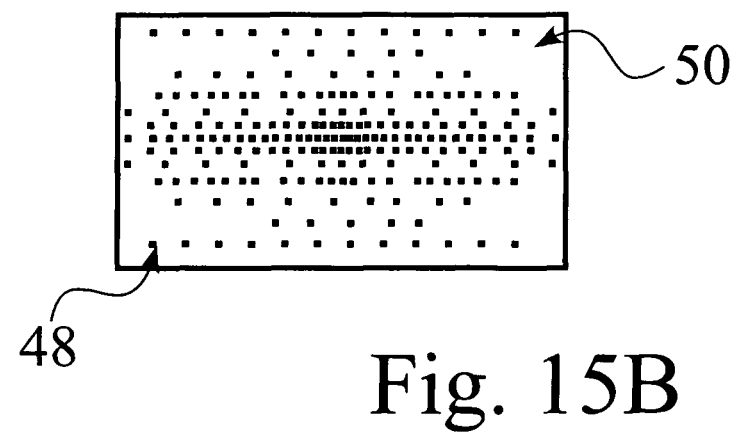

FIGS. 15A and 15B illustrate this feature of the invention, which utilizes a high density concentration of pixels 48 at the center of a sensor. By concentrating pixels near the central region of the sensor, digital zoom becomes possible without loss of image detail. This unique approach provides benefits for flat or curved sensors. In FIG. 15A, a conventional sensor 46 is shown, which has pixels 48 that are generally uniformly disposed over the surface of the sensor 46. FIG. 15B also offers a depiction of a sensor 48 produced in accordance with the present invention, which has pixels 48 that are more densely arranged toward the center of the sensor 50.

In another embodiment of the invention, suitable software will compress the dense data coming from the center of the image when the camera senses that a wide angle picture is being taken. This feature greatly reduces the processing and storage requirements for the system.

Lens Shade

Another embodiment of the invention includes a lens shade, which senses the image being captured, whether wide angle or telephoto. When the camera senses a wide angle image, it automatically retracts proportionately. When it senses the image is telephoto, it automatically extends proportionately. blocking extraneous light from the non-image areas, which can cause flare and fogged images.

Figure 16A:
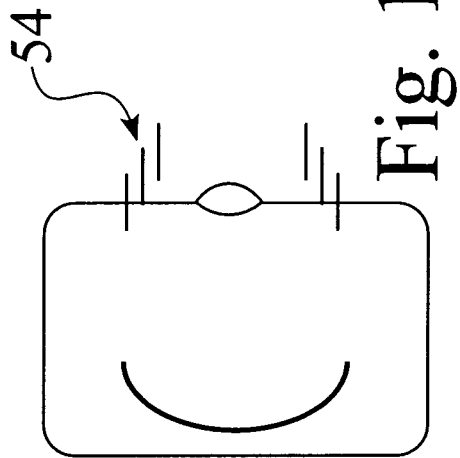
Figure 16B:
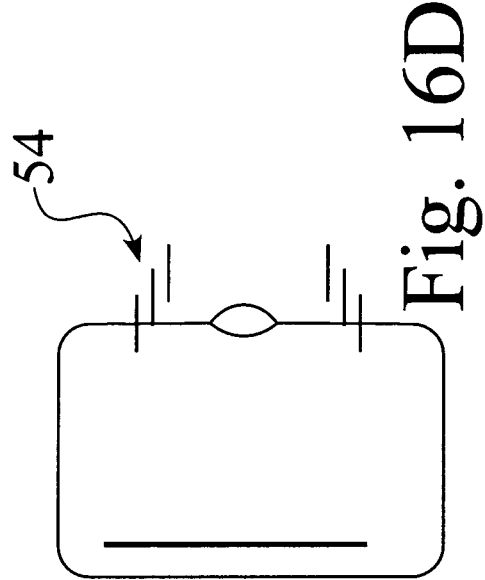
Figure 16C:
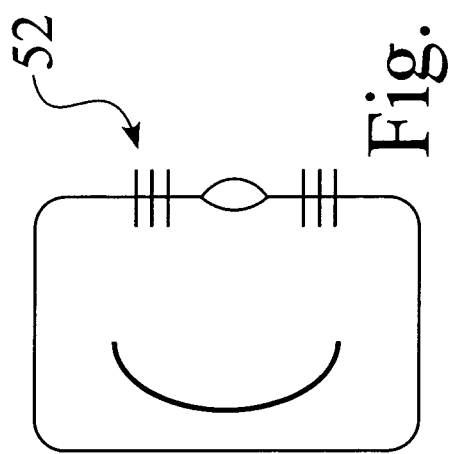
Figure 16D:
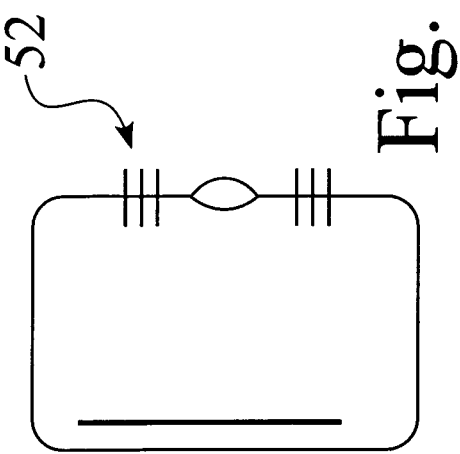

FIGS. 16A and 16B provide views of cameras equipped with an optional retractable lens shade. For wide angle shots, the lens shade is retracted, as indicated by reference character 52. For telephoto shots, the lens shade is extended, as indicated by reference character 54.

Dust Reduction & Insulation

The present invention reduces the dust problem that plagues conventional cameras. With the present invention, no lens changes are needed and no optical zoom, which often sucks in outside air, is needed. Therefore, the camera bodies and lenses are sealed. No dust enters to interfere with image quality. A heavy dried gas, such as Krypton, Argon or Xenon, may be sealed in the lens and sensor chambers within the enclosure 14. The camera gains some benefits from the thermal insulating capability of these heavier gases. Temperature changes will be moderated. Condensation will be reduced or eliminated.

Better Optical Performance

The optical performance of the present invention is greater than conventional devices, since simpler lenses let through more light. The economics of placing more pixels in the center of the sensor makes digital zoom practical for the first time. Since the new lenses need fewer compromises due to:

reduced light at the edges of flat sensors;
    more chromatic aberrations near the edges of flat sensors;
    fewer lens elements required, making faster lenses which can operate in lower light without artificial lighting; and
    fewer lens elements reduce cost, weight and bulk.

The present invention may be used in conjunction with a radically high speed lens, useable for both surveillance without flash (or without floods for motion) or fast action photography. This becomes possible again due to the non-planar sensor, and makes faster lenses like a f/0.7 lens possible, and others, like an f/1.0 lens, within practical reach, since the restraints posed by a flat sensor (or film) are now gone.

All these enhancements become practical since new lens formulas become possible. Current lens design for flat film and sensors must compensate for the "rainbow effect" or chromatic aberrations at the sensor edges, where light travels farther and refracts more. Current lens designs have to compensate for the reduced light intensity at the edges. These compensations limit the performance possibilities.

Since the camera lens and body are sealed, a desiccated, heavy gas like Argon or Krypton or Xenon can be inserted during assembly, moderating temperature swings.

Mirrored Camera & Lens Combination

FIG. 17 reveals yet another embodiment of the invention, which includes a mirrored camera and lens combination 60. Primary and secondary objective lenses 62 and 64 gather incoming light 18. A first sensor 66 catches a centered image, while a second sensor 68 catches an image reflected from the mirror 70. A processor stitches together the "doughnut" image to the "doughnut hole" image.

FIG. 18 portrays another embodiment which is a variation of the embodiment shown in FIG. 17. The embodiment shown in FIG. 18 includes a sensor 72 mounted just outside the light path of the lens, with a mirror 70 that may be aspheric, may be asymmetrical, or may be both aspheric and asymmetrical, to send the image to that sensor without any obstructions to the light paths from the primary lens, which conventional mirror lenses have. This is because, in conventional mirror lenses, that second spot is a necessary and secondary mirror, which reflects the image from the primary mirror out the back end through a hole in the primary mirror. The sensor, or eyepiece, of film, then receives the image through that hole. The problem is that by using this "doughnut only" part of the image, "bokeh" is created.

Mirror lenses are lighter, cheaper and, in applications for astronomy, far more practical, since the weight of glass makes large optics hard to hold up and maintain shapes. For conventional photography, mirrored lenses are fatter, shorter, cheaper and perform slightly worse than optical lenses. Purely mirrored lenses have an advantage of starting out with no chromatic aberrations, requiring fewer corrections. However, current mirror lenses use a second mirror centered in front of the lens, which reflects the image back into the camera.

In the embodiment of the invention shown in FIG. 17, a center lens, front sensor and transmitter with back sensor is added. It uses a primary lens to direct the images onto the back mirror, which is curved. Camera and astronomy mirror lenses currently use this first objective lens to hold that center spot in place. The present invention also has this same center spot, but, adds a small lens facing outward and focusing the center image data onto a small sensor. That captured data, the "doughnut hole" data, is then woven into the other lens data reflected from the big mirror, the "doughnut" data. These two data sets are then combined to create an image without "bokeh," which is explained next. Between that sensor 68 and the doughnut hole and sensor 64 are a processor and transmitter. It combines the "doughnut hole and doughnut" images into a receiver outside the optical paths. All current mirror lenses have this problem called "bokeh" which is English for the Japanese word which translates as "fuzzy." This is prominent in the less focused areas of a photo, where the loss of the central image portion causes unusual blurring.

The embodiment shown in FIG. 17 eliminates bokeh by using the center spot as another lens with two sensors. One looks forward for the direct doughnut hole image. The second faces the in the opposite direction. Using a lens, the reflected doughnut image portion of the composite picture is captured.

FIG. 17 shows how the front of that sensor captures the central axis rays, and combines them with the outer rays to form a complete image.

FIG. 18 shows a different embodiment that eliminates bokeh. FIG. 18 uses an asymmetric, or tilted, or aspheric mirror, or a combination which reflects the image to a sensor that is outside of the entering light primary path. This arrangement avoids a center obstruction.

Rotating & Shifted Sensors

FIGS. 19A and 19B illustrate a series of alternative sensor arrays with sensor segments 32c separated by gaps 34, to facilitate easier sensor assembly. In this embodiment, a still camera which utilizes this sensor array takes two pictures in rapid succession. A first sensor array is shown in its original position 74, and is also shown in a rotated position 76. The position of the sensor changes between the times the first and second pictures are taken. Software is used to recognize the images missing from the first exposure, and stitches that data in from the second exposure. The change in the sensor motion or direction shift may vary, depending on the pattern of the sensor facets.

A motion camera might do the same, or, in a different embodiment, might simply move the sensor and capture only the new image using the data from the prior position to fill in the gaps.

This method captures an image using a moveable sensor with gaps between the small, flat sensors that make up the generally curved sensor. This method makes fabricating much easier, because the spaces between segments become less critical. This also provides connecting pathways from the sensors that will be shorter on average than with a conventional, single piece sensor. Outer row sensors are slightly smaller, row by row, so each row can curve into the concave shape slightly more, creating the generally non-planar total sensor. This increases speed and reduces manufacturing cost. So, in one example, a square sensor in the center is surrounded by a row of eight more square sensors, which, in turn, is surrounded by another row of sixteen square sensors. The sensors are trimmed to fit the circular optical image, and each row curves in slightly more, creating the non-planar total sensor.

The camera takes one picture. The sensor immediately rotates or shifts slightly and a second image is immediately captured. Software compares the two exposures, and can tell where the gaps were and stitches the new data from the second shot into the first. Or, depending on the sensor's array pattern, it may shift linearly in two dimensions, and possibly arc in the third dimension to match the curve.

This embodiment makes the production of curved sensors easier. The composite sensor, in this case, is a large sensor comprising multiple smaller sensors. All of these methods of connection may also be used to power the moving sensor. When such a complex sensor is used to capture a focused image, the gaps between each sensor lose data that is essential to make the complete image. Small gaps reduce the severity of this problem, but smaller gaps make the assembly of the sensor more difficult. These gaps give the assemblers and designers another advantage. There will be shorter average connections between each pixel and the processor. Larger gaps make assembly easier and more economical, but, create an even less complete image. The present invention, however, solves that problem by moving the sensor after the first image, and taking a second image quickly. This gives the complete image after the software isolates the data that is collected by the second image, some of which came from the gaps and splices it into the first image. The same result may be achieved by a tilting lens element that shifts the image slightly during the two rapid sequence exposures. In one example shown in FIG. 19B, the sensor rotates back and forth. In an alternative embodiment, the sensor may shift sideways or diagonally, or may arc its curvature. In yet another embodiment, the sensor might rotate continuously, while the software combines the data into a complete image.

FIGS. 20A and 20B also shows a second set of sensors. The sensor is first shown in its original position 78, and is then shown in a displaced position 80.

Sensor Grid Patterns

FIGS. 21A, 21B, 21C and 21D reveal four alternative grid patterns for four alternative embodiments of sensors 82, 84, 86 and 88. The gaps 34 between the facets 32e, 32f, 32g and 32h enable the manufacturing step of forming a curved sensor.

Electrical Connections to Sensors

FIGS. 22, 23 and 24 provide views of alternative embodiments of electrical connections to sensors.

FIG. 22 shows a sensor 90 has a generally spiral-shaped electrical connector 92. The conductor is connected to the sensor at the point identified by reference character 94, and is connected to a signal processor at the point identified by reference character 96. This embodiment of an electrical connection may be used when the sensor is rotated slightly between a first and second exposure, as illustrated in FIG. 19B. This arrangement reduces the flexing of the conductor 92, extending its life. The processor may built into the sensor assembly.

FIG. 23 shows the back of a sensor 102 with an "accordion" shape conductor 100, which is joined to the sensor at point A and to a processor at point B. This embodiment may be used when the sensor is shifted or displaced between a first and second exposure, as illustrated in FIG. 20B.

This type of connection, in addition to the coiled wire connection, makes a back and forth or rotating sensor connection durable.

FIG. 24 shows the back of a sensor 114 having generally radially extending conductors. The conductors each terminate in brush B which are able to contact a ring. The brushes move over and touch the ring, collecting an output from the rotating sensor, and then transmit the output to the processor at the center C. This embodiment may be used when the sensor is rotated between exposures. In addition, this connection makes another embodiment possible; a continuously rotating sensor. In that embodiment, the sensor rotates in one direction constantly. The software detects the gaps, and fills in the missing data from the prior exposure. This type of connection may also be used to power the sensor.

Wireless Connection

FIG. 25 offers a block diagram of a wireless connection 118. A sensor 12 is connected to a transmitter 120, which wirelessly sends signals to a receiver 122. The receiver is connected to a signal processor 124. In this embodiment, power may be induced to the sensor, keeping the connections wireless.

Image De-stabilization

In another alternative embodiment of the invention, part of the optical train of the camera is intentionally destabilized and the image shifts on the sensor between two rapid sequential exposures, which are each stabilized. This embodiment provides a method for restoring lost portions of an image due to the gaps between the facets of the sensor. This embodiment of the invention includes one or more gyros or inertial motion units.

When a picture is taken, the camera first takes an ordinary exposure using image stabilization. The camera then destabilizes the image and moves it. It next takes a second exposure in rapid succession. The image is re-stabilized for the second exposure, and the software detects the data that was missed by the first exposure in the gaps on the generally curved sensor, and splices them into a complete picture. This stabilized first exposure, followed by intentional de-stablilization and sensor movement into a second exposure which is stabilized again, combined by software, creates a complete image.

The first and second images are then compared to capture the portions of the image that the first exposure may have missed due to the gaps between the facets of the sensors. A final, complete image is then composed using the first and second exposures. This process may be continuous for motion pictures.

III. Summary of Features & Advantages

In summary, the advantages offered by the present invention include, but are not limited to:

High resolution digital zoom
Faster
Lighter
Cheaper
Longer focusing ranges
More reliable
Lower chromatic aberration
More accurate pixel resolution
Eliminate need for flash or floodlights
Longer battery life
Zooming from wide angle to telephoto IV. Applications & Implementations of the Invention Machine Vision Cameras Machine Vision Cameras operate robotically in some cases, and as production tools in other cases. Their ability to spot imperfections, such as flaws in a sheet of film being produced, a bottle only half filled, or a label misplaced, depends on reasonable resolution and color fidelity, often at high speeds. When implemented in accordance with the present invention, image quality improves, since the light rays near the edge hit the sensor closer to a right angle; just like the light rays at the center. Reflected light is reduced. This curved shape also balances light intensity across the sensor with less complex lenses. Chromatic aberration is also reduced at the edges, without requiring complicated lens designs, since the light rays going to the sensor's edges do not travel as far, reducing that "rainbow spread." Since incoming photons impinge upon the edge of the sensors at closer to a right angle, reflections tend to leave the camera back through the lens. Bleeding into the next pixel is also reduced. The incoming light is also more evenly balanced across the sensor. This is all accomplished without requiring excessive lens corrections, freeing the optical designer to concentrate more on resolution and contrast. This advantage holds for a traditional monocular machine vision camera, and, also applies to a stereo adaptation. The stereo adaptation might use sensors with alternating polarity and two lenses with different polarity. The stereo version might also use color filters on or in the two different lenses, with filtered sensors, creating a 3-D effect in black and white. All versions mentioned benefit from an ability to create faster lenses, so available light can be less intense while still capturing the visual data. Or, a lens designer may deliver higher contrast and resolution with truer colors, while having more speed than conventional lenses.

Long Distance Cameras

Some applications, like astronomy, wildlife photography, airborne, orbital and sports pictures use cameras with extreme telephoto lenses. When implemented in accordance with the present invention, the sensors for these cameras may often have less curvature since the light rays coming in are closer to parallel. However, the slight curvature in the sensor yields the same benefits for these optics designs. Without worrying about chromatic aberrations, changes in intensity across the sensor and bleeding under individual pixels into adjoining individual pixels at the edges, all design work can focus more on resolution and contrast, or speed, or both. In some cases, these cameras may benefit from capturing radiation that is outside the visible spectrum.

Close-up Cameras

Most cameras cannot focus closer than a meter away with their normal lenses. To take closeup pictures, cameras with interchangeable lenses often have a selection of "macro" lenses that make it possible to get closer. They also can still take normal pictures of people nearby or even a distant horizon shot. The disadvantage, however, is that macro lenses are slow. In most lens lines, the macro lenses let less than a fourth as much light pass through as with their standard lenses. Since the present invention relieves the restrictions placed on normal lenses and macro lenses, by distributing the light evenly across the sensor and hitting the sensors at closer to an average of a right angles, new lens designs can concentrate on closer focusing without losing speed. Or, an optics designer may choose to stay as slow as conventional macro lenses, but offer more resolution, contrast or color fidelity than before.

Low Light Cameras

These cameras use bigger lenses and apertures to capture more light. No artificial light is needed. This makes moonlight photography possible at shutter speeds that capture action without blurring. This is possible, for the first time, with the curved sensor, since lens designs are freed of the restriction imposed by flat sensors. Those restrictions are the needs to reduce chromatic aberrations at the edges. Sensor designs are also freed from the need to rebalance the light which is weaker at the edges of flat sensors. Sensor designs also are freed from worrying about acutely angled light undercutting pixels at the edges and bleeding into adjoining pixels, since, in accordance with the present invention, the light strikes them at closer to right angles. Optical design is freed to concentrate on capturing more light with these faster lenses.

High Performance Pocket Cameras

The most prevalent example of pocket cameras today is the wide-ranging photography being done by smart phones. The results are acceptable but not up to normal visual standards when enlarged. They then "pixilate" and get the "jaggies" when enlarged or cropped. Since the optics and sensor designers have to concentrate on chromatic aberrations and bleeding at the edges of the flat sensors, resolution suffers. Since the present invention relieves those problems, new pocket cameras will deliver higher quality images.

Night Vision Goggles & Cameras

When implemented in accordance with the present invention, higher resolution becomes possible near the edges since there's less bleeding between pixels than with a flat sensor. Stray light is reduced since, again, the average rays strike the sensor at closer to a right angle.

Light which is directly reflected off of a flat sensor bounces around inside a camera body. A small portion of these bouncing photons hit the sensor again, slightly fogging the image. With a curved sensor, the light which is directly reflected off the sensor tends to pass back out through the lens.

Microscopes

More light and better detail is seen when the present invention is implemented, as opposed to a flat sensor. This is due to reduced stray light, since the rays hit the sensor at closer to right angles. It is also due to reduction of chromatic aberration at the edges of the sensor, due to those rays not traveling as far. And the need to balance the intensity of the light across the sensor is reduced. This lets the optics designs concentrate more on getting brighter and sharper images, with more magnification.

Medical Imaging Systems

Mini-cameras that go into arteries, the digestive tract, reproductive organs, etc. can produce better images with less size using the present invention. This is because being rounded, the present invention itself has less radius than its equivalent flat sensor. The optics can also be simpler while still delivering better images since less color aberration happens at the edges, bleeding between sensors at the edges is reduced and the incident, or stray, light created by rays hitting lens surfaces at angles is reduced. Physicians will see capillaries, polyps, cancers and ulcers in more detail.

Copier Cameras

The superior resolving and contrast possibilities of optics using the present invention makes copy machines with fewer moving parts and better images possible.

V. Additional Applications

Additional applications that may incorporate the present invention, include, but are not limited to:

Telescopes
Solar arrays
Binoculars and monoculars
Spectroscopy
Surveillance
RFID systems
Remote temperature sensing devices
IR chips
Surveying instruments
Sonograms

SCOPE FO THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Curved Sensor System that have been disclosed above are intended to educate the reader about preferred embodiments of the invention, and are not intended to constrain the limits of the invention or the scope of Claims.

LIST OF REFERENCE CHARACTERS

10 Camera with curved sensor
12 Curved sensor
14 Enclosure
16 Objective lens
18 Incoming light
20 Electrical output from sensor
22 Signal processor
24 User controls
26 Battery
28 Memory
30 Camera output
32 Facet
34 Gap between facets
36 Via
38 Wiring backplane
40 Curved sensor formed from adjoining petal-shaped segments
42 Petal-shaped segment
44 Camera monitor
46 Conventional sensor with generally uniform pixel density 48 Sensor with higher pixel density toward center
50 Pixel
52 Shade retracted
54 Shade extended
56 Multi-lens camera assembly
58 Objective lens
60 Mirrored camera/lens combination
62 Primary objective lens
64 Secondary objective lens
66 First sensor
68 Second sensor
70 Mirror
72 Side-mounted sensor
74 Sensor in original position
76 Sensor in rotated position
78 Sensor in original position
80 Sensor in displaced position
82 Alternative embodiment of sensor
84 Alternative embodiment of sensor
86 Alternative embodiment of sensor
88 Alternative embodiment of sensor
90 View of back side of one embodiment of sensor
92 Spiral-shaped conductor
94 Connection to sensor
96 Connection to processor
98 View of back side of one embodiment of sensor
100 Accordion-shaped conductor
102 Connection to sensor
104 Signal and/power connection to processor
106 View of back side of one embodiment of sensor
108 Radial conductor
110 Brush
112 Brush contact point
114 Annular ring
116 Center of sensor, connection point to processor
118 Schematic view of wireless connection
120 Transmitter
122 Receiver
124 Processor

What is claimed is:

1. A method for capturing an image comprising the steps of:
fabricating a plurality of petal-shaped semiconductor segments to form a wafer of sensor chips;
said wafer of sensor chips having a front side and a back side;
selected a flexible membrane which is sufficiently rigid to maintain a curved shape, but which is able to bend without breaking;
attaching said back side of said wafer of sensor chips to said flexible membrane;
bending said wafer of sensor chips slightly to form a curved surface;
etching a plurality of thin lines into said wafer of sensor chips facet, but not through said flexible membrane;
forming said wafer of sensor chips and said flexible membrane into a generally curved surface;
said plurality of petal-shaped semiconductor segments which are shaped into a generally curved surface;
each of said petal-shaped semiconductor segments being, connected at a common point which, after bending, generally forms the center of said generally curved surface;
forming a plurality of vias through said flexible membrane;
attaching said wafer of sensor chips to a backside wiring harness through said plurality of vias;
providing a signal processor;
connecting said signal processor to said backside wiring harness; and
generating a digital image from said signal processor.

2. A method as recited in claim 1, in which:
said plurality of petal-shaped semiconductor segments is fabricated from ultra-thin silicon.

3. A method as recited in claim 1, in which:
said plurality of petal-shaped semiconductor segments is fabricated from ultra-thin silicon.

4. A method as recited in claim 1, in which:
said plurality of petal-shaped semiconductor segments are joined using a flash of heat and a plurality of painted surfaces to locate the heat on said segments where the maximum compression and tension occur in folding.

5. A method as recited in claim 1, in which:
said harness provides mechanical support for said wafer of sensor chips.

6. A method as recited in claim 1, in which:
a plurality of pixels are formed on said plurality of petal-shaped semiconductor segments in varying density.

7. A method as recited in claim 1, in which the pixel density on said plurality of petal-shaped semiconductor segments is increased at the points of the segments, and is gradually decreased toward the base of each of said segments.

8. A method as recited in claim 1, in which:
said plurality of petal-shaped semiconductor segments are configured to have a relatively higher concentration of pixels generally near the center of said curved sensor.

9. A method as recited in claim 1, in which:
said plurality of petal-shaped semiconductor segments are configured to have a relatively lower concentration of pixels generally near the edges of said segments.

10. A method as recited in claim 1, in which:
said plurality of petal-shaped semiconductor segments are configured to have a relatively high concentration of pixels generally near the center of said segments.

* * * * *